US00RE47438E

(19) United States
(12) Reissued Patent
Hill

(10) Patent Number: US RE47,438 E
(45) Date of Reissued Patent: Jun. 18, 2019

(54) UV INKJET PRINTING OF VISION CONTROL PANELS

(71) Applicant: CONTRA VISION LTD., Bramhall (GB)

(72) Inventor: George Roland Hill, Bramhall (GB)

(73) Assignee: CONTRA VISION LIMITED, Bramhall, Stockport, Cheshire (GB)

(21) Appl. No.: 14/816,555

(22) Filed: Aug. 3, 2015

Related U.S. Patent Documents

Reissue of:
(64) Patent No.: 8,500,268
Issued: Aug. 6, 2013
Appl. No.: 11/816,765
PCT Filed: Feb. 21, 2006
PCT No.: PCT/GB2006/000601
§ 371 (c)(1),
(2) Date: Aug. 21, 2007
PCT Pub. No.: WO2006/087583
PCT Pub. Date: Aug. 24, 2006

(30) Foreign Application Priority Data

Feb. 21, 2005 (GB) ..... 0503532.4

(51) Int. Cl.
*B41J 2/01* (2006.01)
*B41M 3/00* (2006.01)
*B41J 2/21* (2006.01)

(52) U.S. Cl.
CPC ..... *B41M 3/008* (2013.01); *B41J 2/2117* (2013.01); *Y10T 428/24802* (2015.01); *Y10T 428/24868* (2015.01)

(58) Field of Classification Search
CPC ..... B41M 3/008; B41J 2/2117; Y10T 428/24868; Y10T 428/24802
See application file for complete search history.

(56) References Cited

U.S. PATENT DOCUMENTS 4,630,076 A 12/1986 Yoshimura
4,660,757 A 4/1987 Hicks
5,144,328 A 9/1992 Blake et al.
5,795,425 A 8/1998 Brault et al.
(Continued)

FOREIGN PATENT DOCUMENTS

DE 102005006092 A1 8/2005
EP 1331100 A2 7/2003
(Continued)

OTHER PUBLICATIONS

European Communication pursuant to Rule 114(2) EPC dated Nov. 23, 2015 in corresponding European Patent Application No. 06709837.6 (3 pages).

*Primary Examiner* — Christina Y. Leung
(74) *Attorney, Agent, or Firm* — Pillsbury Winthrop Shaw Pittman LLP

(57) ABSTRACT

This invention concerns vision control panels and a method of UV inkjet printing vision control panels. A substantially imperforate light permeable material is partially printed with a 'print pattern' comprising a base layer and a design layer comprising a design colour layer. The method is limited to digital UV inkjet printing of all the superimposed layers required to make such panels. Optionally, the method uses a novel printhead array with a novel order of ink color supply and/or novel software to enable the required build-up of ink layers, for example of black, optional silver, white, cyan, magenta, yellow and process black colors. Printing is preferably arranged so that the base layer and design color layer are printed in the minimum number of passes of the printhead assembly of the digital UV inkjet printer to achieve the desired effect, preferably in one pass of the printhead assembly.

28 Claims, 25 Drawing Sheets

(56) References Cited

U.S. PATENT DOCUMENTS

| | | | | |
|---|---|---|---|---|
| 5,830,529 | A | 11/1998 | Ross | |
| 6,086,198 | A | 7/2000 | Shields et al. | |
| 6,102,537 | A | 8/2000 | Kato et al. | |
| 6,206,502 | B1 * | 3/2001 | Kato et al. | B41J 2/2132 347/41 |
| 6,507,413 | B1 | 1/2003 | Mueller et al. | |
| 6,582,861 | B2 | 6/2003 | Buxbaum et al. | |
| 6,585,369 | B1 | 7/2003 | Sievert et al. | |
| 6,769,766 | B2 | 8/2004 | Suzuki et al. | |
| 6,789,867 | B2 * | 9/2004 | Takahashi et al. | B41J 2/2132 347/12 |
| 6,902,249 | B2 | 6/2005 | Suzuki et al. | |
| 7,009,630 | B1 * | 3/2006 | Finger et al. | 347/212 |
| 7,152,969 | B2 | 12/2006 | Hintermann | |
| 7,178,898 | B2 | 2/2007 | Hoshino | |
| 7,237,861 | B2 | 7/2007 | Suzuki et al. | |
| 7,562,957 | B2 | 7/2009 | Mills et al. | |
| 7,794,077 | B2 | 9/2010 | Falser et al. | |
| 2003/0202026 | A1 | 10/2003 | Smith et al. | |
| 2004/0189770 | A1 * | 9/2004 | Hintermann | 347/102 |
| 2004/0252160 | A1 * | 12/2004 | Iwasaki et al. | B41J 2/2132 347/41 |
| 2005/0012780 | A1 | 1/2005 | Gil | |
| 2006/0158481 | A1 * | 7/2006 | Spevak et al. | 347/43 |

FOREIGN PATENT DOCUMENTS

| | | | |
|---|---|---|---|
| EP | 1838534 | B1 | 10/2007 |
| JP | 2002-38063 | * | 2/2002 |
| JP | 2002-038063 | A | 2/2002 |
| WO | 03/061970 | A2 | 7/2003 |
| WO | WO 03/061970 | A | 7/2003 |

* cited by examiner

Fig. 12A
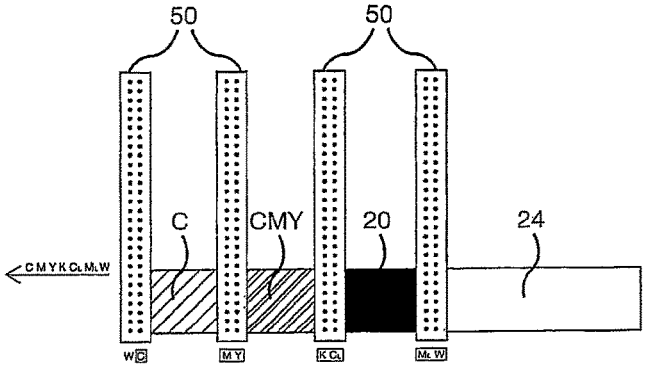
Fig. 12B
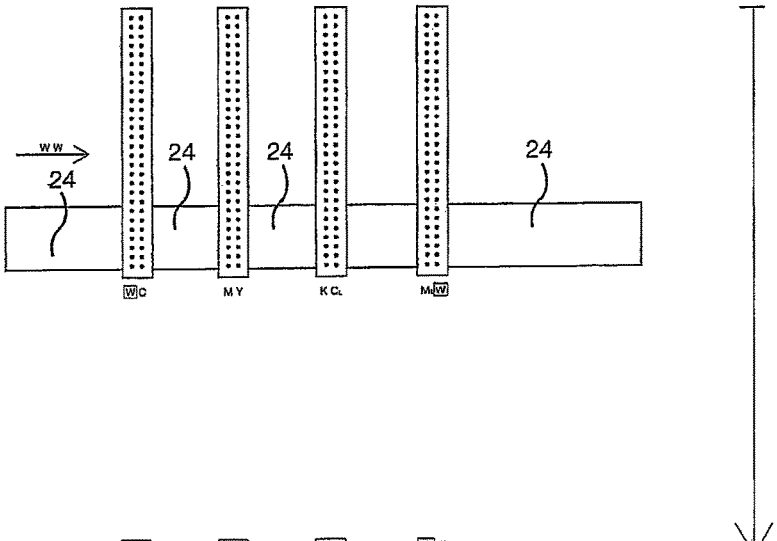
Fig. 12C

UV INKJET PRINTING OF VISION CONTROL PANELS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This is the U.S. National Phase of PCT/GB2006/000601, filed Feb. 21, 2006, which in turn claims priority to British application No. 0503532.4, filed Feb. 21, 2005, both of which are incorporated herein in their entirety by reference.

This invention concerns vision control panels and a method of UV inkjet printing vision control panels. A substantially imperforate light permeable material is partially printed with a "print pattern" comprising a base layer and a design layer comprising a design colour layer. The most common type of vision control panel is a one-way vision panel, which comprises:

(i) a design layer and a base layer, the design layer being visible from one side of the panel but not visible from the other side of the panel, and (ii) substantially clear vision through the panel from the other side.

Another type of vision control panel has a translucent base layer, typically white, allowing the design layer observed from one side of the panel to be visible as a minor image from the other side of the panel and be illuminated from the other side of the panel.

The method is limited to digital UV inkjet printing of all the superimposed layers required to make such panels. Optionally, the method uses a novel printhead array with a novel order of ink colour supply and/or novel software to enable the required build-up of ink layers, for example of black, optional silver, white, cyan, magenta, yellow and process black colours. The method enables an adequate thickness and colour saturation of a white layer or white layers, superimposed on a black layer, to act as a suitable white background multi-colour process or "spot" colour inkjet printed design and for the base layer or layers to be substantially opaque, so that the design is not visible from the other side, a requirement not previously practically achievable with inkjet printing of all layers. Printing is preferably arranged so that the base layer and design colour layer are printed in the minimum number of passes of the printhead assembly of the digital UV inkjet printer to achieve the desired effect, preferably in one pass of the printhead assembly.

BACKGROUND TO THE INVENTION

Vision control panels are well known, for example panels according to GB 2 165 292 or EP 0 880 439. Panels according to GB 2 165 292 typically comprise a transparent material which is partially imaged with an opaque "silhouette pattern" onto which is superimposed a design, such that the design is visible from one side of the panel but is not visible from the other side. They may also have a second design that is visible from the other side but not visible from the first side. Panels according to EP 0 880 439 typically comprise a transparent material that is partially imaged with a translucent "base pattern" typically comprising a white base layer onto which is superimposed a translucent design, which is visible from the first side and a mirror image of the design is visible from the other side when there is sufficient illumination on one or both sides. The design visible from one side can be illuminated from the opposite side. There are many other types of panel disclosed in these two patents which may collectively be termed vision control panels.

GB 2 165 292 and GB 2 188 873 disclose methods of printing superimposed layers of ink with exact registration by applying layers of ink of greater area than required in the finished product and removing unwanted ink to leave the desired remaining layers of ink in exact registration.

EP 0 858 399 and U.S. Pat. No. 6,506,475 (WO 02/070269) disclose methods of managing the inevitable lack of registration of normal printing methods in order to manufacture vision control panels with the desired perceived colours, which would not otherwise be consistently achieved.

EP 0 904 206 discloses manipulation by a computer of a design to create unprinted areas of a transparent material to which the design is applied. It also discloses the digital inkjet printing of vision control panels including the use of both water-based and solvent-based ink; it also identifies problems of opacity and the problem of registration of multiple layers associated with inkjet printing. It discloses certain methods of seeking to overcome these problems but it does not disclose the use of UV curable inkjet inks or UV inkjet printing machines.

EP 0 934 169 and WO 04/0045937 disclose methods of making vision control panels by digital inkjet printing of a pre-printed "print pattern", typically a screen printed pattern of white-on-black dots or lines. Together, these documents disclose possible inkjet printing of the design layer by water-soluble ink or solvent ink or UV curable ink but these methods are based on the premise that inkjet printing of all layers is impractical.

In making one-way vision panels according to GB 2 165 292, it is typically required to have a black layer of the silhouette pattern visible from the other side to the design, in order to provide the best possible through vision. However, a white layer is typically required as a background to printing the design colours and more than one layer of white is typically required in order to create a suitable white background for printing the design. The use of a silver layer intermediate a white and black layer to achieve a more visually opaque white (higher thickness and/or saturation) is well known and specifically disclosed in the making of vision control panels in BP 0 858 399 and WO 02/070269.

EP 1 535 750 A2 discloses the computer manipulation of artwork by means of a computer "window wizard" to produce see-through graphic panels. WO 2005/053963 and image manipulation software manuals, such as for Adobe Photoshop™, disclose the cropping of an image around subject matter in a graphic image and providing a mask background, typically white, to the cropped image. WO 2005/053963 also discloses UV inkjet printing onto transparent substrates.

So-called "selective blocking" of areas of see-through graphic panels has been practised since the 1980's by licensees of Contra Vision Ltd, UK, for example to highlight subject matter or to enable small print to be visible, by infilling portions of the panel that would otherwise be transparent in a uniform pattern, for example, of dots or lines.

Digital UV inkjet printers with multi-colour process inks, for example cyan, magenta, yellow and black (CMYK), and additional white or other "spot colours" are known. The use of continual mechanical stirring or other method of ink agitation such as inert gas-burst and temperature control to assist the digital printing of white ink are known.

BRIEF DESCRIPTION OF THE INVENTION

According to a first aspect of the invention, there is provided a panel comprising an imperforate sheet of coloured or colourless light permeable material partially printed with a print pattern comprising a plurality of ink layers, Said ink layers comprising a base layer, said ink layers comprising a design comprising a design layer, said design layer comprising a design colour layer, said print pattern comprising a plurality of connected and/or unconnected print pattern elements, said print pattern subdividing the panel into a plurality of areas of said print pattern and/or a plurality of unprinted areas of said light permeable material, and wherein the percentage of unprinted light permeable material is at least 5% and the light transmissivity of the panel is at least 10%, wherein a cross-section can be taken through said panel comprising two outer edges of said sheet of light permeable material and alternate printed portions and unprinted portions and a plurality of said printed portions comprising a part of said base layer and at least one of said plurality of said printed portions comprising a part of said design colour layer, wherein said design is visually independent of said print pattern elements such that if an observer adjacent to one side of the panel from which the design is normally visible moves away from said one side of the panel in a perpendicular direction from said panel until said individual print pattern elements can no longer be resolved by the eye of said observer said design remains clearly perceptible to said observer, characterized in that all of said plurality of ink layers comprise UV cured ink comprising an agglomeration of overlapping and/or contiguous and/or spaced individual deposits of UV cured ink.

According to a second aspect of the invention, there is provided a method of making a panel comprising an imperforate sheet of coloured or colourless light permeable material partially printed with a print pattern comprising a plurality of ink layers, said ink layers comprising a base layer, said ink layers comprising a design comprising a design layer, said design layer comprising a design colour layer, said print pattern comprising a plurality of connected and/or unconnected print pattern elements, said print pattern subdividing the panel into a plurality of areas of said print pattern and/or a plurality of unprinted areas of said light permeable material, and wherein the percentage of unprinted light permeable material is at least 5% and the light transmissivity of the panel is at least 10%, wherein a cross-section can be taken through said panel comprising two outer edges of said sheet of light permeable material and alternate printed portions and unprinted portions and a plurality of said printed portions comprising a part of said base layer and at least one of said plurality of said printed portions comprising a part of said design colour layer, wherein said design is visually independent of said print pattern elements such that if an observer adjacent to one side of the panel from which the design is normally visible moves away from said one side of the panel in a perpendicular direction from said panel until said individual print pattern elements can no longer be resolved by the eye of said observer said design remains clearly perceptible to said observer, characterized in that all of said plurality of ink layers comprise UV cured ink comprising an agglomeration of overlapping and/or contiguous and/or spaced individual deposits of UV cured ink, said method comprising the steps of:

(i) providing a substantially imperforate sheet of coloured or colourless light permeable material, and (ii) printing both said base layer and said design colour layer by means of a digital inkjet printer, characterized in that all said plurality of ink layers comprise UV cured ink printed by said digital inkjet printer.

The digital inkjet printer comprises an array of printheads in a printhead assembly, each printhead typically comprising a plurality of inkjet nozzles, typically in a line of nozzles. The printhead assembly is typically movable relative to the light permeable material in orthogonal X-Y directions. Each line of nozzles is typically supplied by a single colour of UV-curable ink. The printhead assembly is moveable relative to the light permeable material such that the lines of nozzles are typically presented in and can print in the sequential order of black ink, then white ink, both black and white inks typically printing base layers, followed by ink for the design colour layer. Typically, the panel comprises a plurality of base layers and said design layer comprises a plurality of design colour layers and, preferably, said plurality of base layers and said plurality of design colour layers are printed simultaneously in a single pass of the printhead assembly of the digital inkjet printer.

The term "light permeable material" as used herein is intended to mean a material that allows light to pass through it and includes both "transparent material" and "translucent material". The light permeable material is imperforate, although it should be understood that this does not preclude the incorporation of holes, for example for fixing the panel, the light permeable material remaining substantially imperforate.

The term "transparent material" as used herein is intended to mean a transparent material that has two substantially parallel and plane surfaces or otherwise allows clarity of vision from one side of the material through the material, enabling the eye to focus on an object spaced from the other side of the material and thus providing a substantially undistorted image of the object. The transparent material does not have to be colourless or "water clear" but is optionally tinted to any required colour.

The term "translucent material" as used herein is intended to mean a material which will allow light transmission but is not a transparent material (as defined herein).

Examples of light permeable materials include: rigid or semi-rigid sheet material, for example of glass, acrylic, polycarbonate, polyvinyl chloride, crystal polystyrene, polypropylene or polyester, or filmic material, for example of polycarbonate, polyvinyl chloride, polypropylene or polyester. Clear, self-adhesive film assemblies with an opaque liner to be removed before application to a window are included within the term light permeable material, the resultant panel comprising a window, adhesive layer and printed film layer being light permeable.

The term "design" as used herein is intended to mean any graphic image such as indicia, a photographic image or a coloured image of any type. The design is typically perceived to be visually independent of the print pattern elements. This feature can be tested by an observer. If the observer adjacent to one side of the panel from which the design is normally visible moves away from the one side of the panel in a perpendicular direction from the panel until individual print pattern elements can no longer be resolved by the eye of the observer the design remains clearly perceptible to the observer. The design comprises at least one "design layer" and can be of uniform colour throughout the print pattern. Optionally, the design also comprises part of a base layer, seen by an observer as a background to a design layer.

A "design layer" comprises a single or "spot" colour layer and/or a multi-colour process layer, for example a four colour process of cyan, magenta, yellow, black (CMYK). The design layer may also include additional colours to improve apparent gradation within the image, typically cyan and magenta of reduced density commonly known as light or dilute cyan and magenta in a six colour process (CMYK-$C_LM_L$). The design layer may also include additional colours designed to extend the number or gamut of accurately rendered colours available from a four colour ink set. Blue, red, orange, green and violet are well known through practically any known colour can be formulated by practitioners of the art and serve either as an additional or substitute colour. The design layer comprises an agglomeration of overlapping and/or contiguous and/or spaced deposits of UV cured ink, the individual deposits typically being of maximum width less than 5 mm and typically less than 3 mm.

A "design colour layer" is a single colour layer within a design layer.

The term "translucent design layer" as used herein is intended to mean a design comprising translucent material (as defined herein). A translucent design layer typically comprises translucent inks, toners or other marking materials. Another part of a translucent design may be opaque. Another part of a translucent design may comprise transparent material. A design colour layer comprises an agglomeration of overlapping and/or contiguous and/or spaced, deposits of UV cured ink, the individual deposits typically being of maximum width less than 5 mm and typically less than 3 mm.

The term "print pattern" as used herein is intended to mean the geometric pattern within which the plurality of ink layers are located and all the edges of the print pattern are coincident with an edge of at least one of the plurality of ink layers. The print pattern comprises a plurality of connected and/or unconnected print pattern elements. The print pattern subdivides the panel into a plurality of areas of the print pattern and/or a plurality of unprinted areas of the light permeable material. The print pattern may be in many forms, for example it may be a regular geometric element in a regular layout, such as a uniform pattern of dots, a regular geometric element in an irregular layout, a free form element in a regular layout, a free form element in an irregular layout or a combination of regular and free-form elements in regular and/or irregular layouts. Instead of a number of discrete (separate) elements with an interconnected unprinted zone, the print pattern can be a pattern of discrete print pattern elements and discrete unprinted areas, such as a pattern of lines. Alternatively, the print pattern may be formed by interconnected print pattern elements with discrete unprinted areas, such as net, grid or mesh pattern. The print pattern can, if desired, be a combination of interconnected print pattern elements and discrete print pattern elements. The print pattern advantageously comprises connected or unconnected stochastic elements in a random or pseudo-random distribution of print pattern elements, to mitigate known problematic effects such as Moiré patterns arising from the relative position of design layer elements and print pattern elements or design elements such as indicia being partly eliminated by transparent portions between portions of the print pattern. The elements forming the print pattern are normally small, such as dots, preferably of equal size on a regular grid, sometimes referred to in the printing industry as a "halftone", or a pattern of lines, or a grid pattern. The print pattern is typically a continuum and provides an even shading or tinting effect in the absence of a design.

The term "base layer" as used herein is intended to mean a single layer of a single colour of digitally printed UV ink within the print pattern. It may be printed in one continuous, single colour "pass" of a digital UV inkjet printer over the whole of the panel or be printed in staged areas of the panel, in sequence with any other printed layer. The base layer comprises an agglomeration of overlapping and/or contiguous and/or spaced deposits of UV cured ink, the individual deposits typically being of maximum width less than 5 mm and typically less than 3 mm. A base layer typically is of the same geometric pattern as the print pattern but can be a different pattern beyond which other base layers and/or the design layer may extend, all within the print pattern. A base layer optionally subdivides the print pattern into a plurality of base layer portions and/or a plurality of portions devoid of said base layer, in a regular or irregular base layer pattern within the edges of the print pattern. Base layers are typically light-reflective, preferably white, typically acting as a background to a design layer, or are light-absorbing, typically black, typically visible from a side of a panel from which it is desired to provide good through vision.

Typically, a multi-colour process design layer is considered to be in register with a base layer if none of the multi-colour deposits extend substantially outside the edges of the base layer portions bounding the unprinted portions of the light permeable material. Multi-colour deposits outside the edges of the base layer or base layers detract from the quality of through vision in a see-through graphics panel and good registration of the plurality of layers of ink is important to the optical performance of the resultant panels. Methods of managing lack of registration, for example as disclosed in EP 0 858 399 or WO 02/070269 are potentially advantageous in achieving the desired design colour rendering and the desired through visibility.

A design colour layer can be intermediate the light permeable material and any base layer or may be on the side of any base layer remote from the light permeable material. One base layer, for example a white layer, may be between the light permeable material and a design colour layer and another base layer may be on the other side of the design colour layer, remote from the light permeable material, for example a transparent layer to protect the other layers, for example from abrasion or photo-degradation such as UV degradation. There can be a design layer on both sides of a base layer. All the layers can be applied to one side of the light permeable material or one or more layers can be applied to one side of the light permeable material and one or more layers can be applied to the other side of the light permeable material.

A cross-section can be taken through a panel printed by the method of the invention which comprises two outer edges of the sheet of light permeable material and alternate printed portions and unprinted portions, said printed portions comprising a base layer and a design colour layer, and a plurality of said printed portions comprising a part of said base layer and at least one of said plurality of printed portions comprising a part of said design colour layer. The widths of the printed portions are typically less than 10 mm, preferably less than 5 mm, and more preferably less than 1 mm. The widths of the unprinted portions are typically less than 10 mm, preferably less than 5 mm, and more preferably less than 1 mm.

The method can be used to make many different types of vision control panel, for example so-called one-way vision panels according to GB 2 165 292 with a design on one side not visible from the other side, or see-through graphics panels according to EP 0 880 439, the latter having a translucent pattern and a design which can be seen from one side and can be illuminated from the other side.

If the base layer or base layers are opaque and the design layer is superimposed onto the base layer or base layers with substantially exact registration then the design is visible from one side of the panel and is not visible from the other side of the panel. Optionally, a first design is visible from a first side of the panel and is not visible from the other side of the panel and a second design is visible from the other side of the panel but not visible from the first side of the panel. Alternatively, the design can extend beyond the edges of the base layer(s), providing the light permeability characteristics of the panel are maintained, which according to the present invention requires a light transmissivity of at least 10%, in this context light transmissivity meaning the percentage of radiation within the visible spectrum which is incident on one side of the panel which is transmitted to the other side of the panel. Typically, the light permeable material is a transparent material, to allow a degree of through vision.

The print pattern optionally comprises translucent layers as disclosed in EP 0 880 439, typically a white translucent base layer and a translucent design layer which is visible from one side of the panel and a mirror image of the design layer is visible from the other side of the panel when a sufficiently high level of illumination is provided on either or both sides of the panel.

In all panels made by the method, the percentage of unprinted portions of light permeable material is at least 5% and is preferably at least 10%, and more preferably at least 20%, typically to provide a see-through capability.

Typically, through vision can be obtained in either direction through the printed panel when the level of illumination perceived through the panel from the far side of the panel sufficiently exceeds the illumination reflected from and/or transmitted through the base pattern and any design when observed from the near side of the panel. Panels printed by the method can therefore be used for selectively displaying the design or allowing for through vision through the panel, the selectivity being provided by adjustment of the illumination on one side of the panel relative to that on the other side. However, the panels of the invention can typically be illuminated and/or each design arranged thereon such that an observer's brain can select to concentrate upon the design on the panel or concentrate on an object or objects spaced from the other side of the panel.

The panel is optionally part of a larger panel having a different construction and different characteristics in other parts of the larger panel. For example, "selective blocking" can be used to highlight subject matter or to enable small print to be visible, by infilling portions of the panel that would otherwise be transparent in a uniform pattern, for example of dots or lines.

The design on one or both sides may be decorative and/or informative. The panel of the invention may also allow for the control of solar heat gain, glare or UV radiation received within, for example, a building, vehicle or other enclosure or shelter without unduly affecting the visibility outwards. The panels allow the natural or artificial illumination of space to either side from the other side, for example a panel made by the method of the invention can be an advertisement placed in a window of a building and still allow daylight to enter through the window, albeit of reduced intensity, coupled with vision out of the building.

The method of the invention uses a digital UV inkjet printer to print every printed layer in UV curable ink. This process benefits the printing of multiple layers of ink of different colours which are superimposed in one position on a substrate. Each deposit or drop of UV curable inkjet ink is typically cured immediately after impact by means of a UV lamp or lamps located adjacent to the printheads containing the inkjet nozzles. Each layer is therefore self-contained and homogenous, whereas water-based and solvent-based inks are cured primarily by the evaporation of solvents. Superimposed layers of solvent ink can interact, typically by migration of the solvent in the inks from one layer to another, which can also cause migration of colour pigment. This effect, coupled with the difficulty of inkjet printing visually opaque layers of ink, means that a typically required visual effect, of a design visible from one side of the panel which is not visible from the other side of the panel, is not achieved by prior art inkjet printing methods. Curing of UV inks does not require an air drying or heat process between the printing of individual layers, whereas other, digital water-based or solvent-based inkjet inks require, for example, to be cured in a separate drying tunnel or at least require a time delay between the application of different layers of ink to prevent or reduce such interaction of layers.

The invention will now be further explained by reference to the figures.

FIGS. 8 A-N are diagrammatic cross-sections of individual pattern portions illustrating the layer sequences to print various types of vision control panel.

FIGS. 9 A-I are diagrammatic representations of printhead assemblies.

FIG. 10 A-H are diagrammatic representations of a prior art printhead assembly and novel printing sequence.

FIGS. 11 A-H are diagrammatic representations of a prior art printhead assembly and novel printing sequence.

FIGS. 12 A-I are diagrammatic representations of a prior art printhead assembly and novel printing sequence.

FIGS. 13 A-I are diagrammatic representations of a novel offset printhead assembly and novel printing sequence.

In these figures, a print pattern of straight lines is used for example purposes only. The print pattern can alternatively be of curved lines, dots, a grid pattern or any other print pattern, as disclosed herein.

The figures are not to scale, for example print pattern line widths are shown of greater proportional width than would typically be the case, for the sake of clarity. Actual line or other print pattern element widths for vision control panels typically would be less than 10 mm, preferably less than 5 mm, and more preferably less than 1 mm.

Figure 1A:
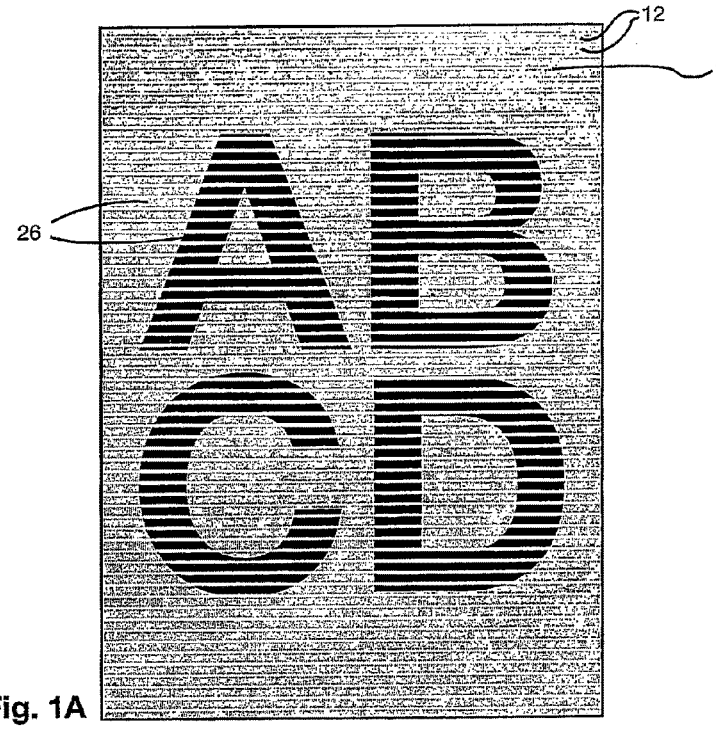
FIG. 1A is a view of one side of a vision control panel with a design ABCD.
Figure 1C:
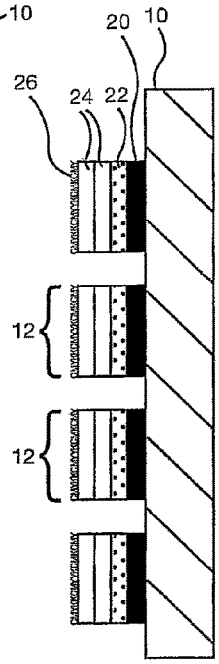
FIG. 1C is a cross-section through the same vision control panel as FIGS. 1A and 1B.
Figure 1B:
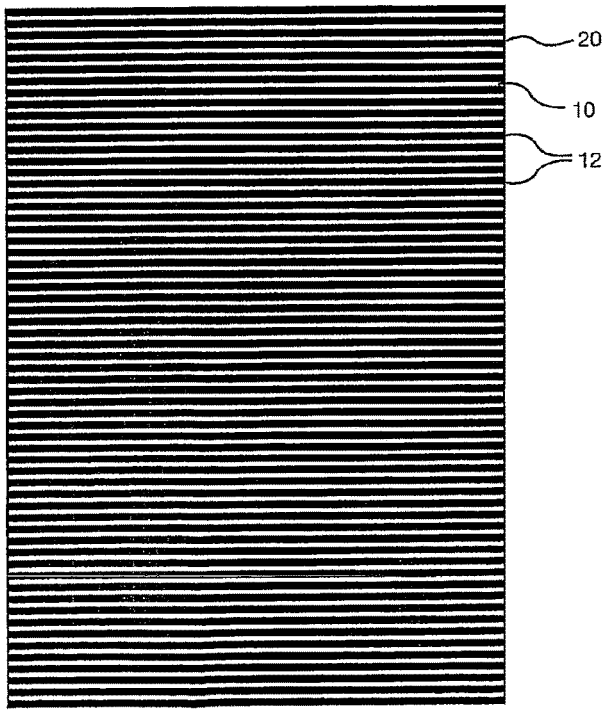
FIG. 1B is a view of the other side of the same vision control panel as in FIG. 1A, from which the design is not visible.

The one-way vision control panel of FIGS. 1A, 1B and 1C comprises a transparent material 10, a print pattern of lines 12, each line typically comprising one dark, typically black base layer 20, optionally one silver layer 22, typically two or more white base layers 24 and a four or six colour process design layer 26, all layers being in as exact registration as possible using the selected transparent material 10 and UV inkjet printing machine. The design layer 26 is visible from one side of the panel in FIG. 1A and the black base layer 20 is visible from the other side of the panel, in FIG. 1B, allowing good vision through the transparent portions of the transparent material 10 to the one side of the panel. FIG. 1C is a diagrammatic cross-section through this one-way vision control panel according to GB 2165 292. Although commonly termed a one-way vision panel, from the one side of the panel an observer can typically choose to concentrate on the design or to see through the design, the degree of through vision depending primarily on the percentage opacity of the print pattern, the relative illumination of the two sides of the panel and the nature of the design, for example the brighter, more reflective the design, the more difficult it is to see through.

Figure 1D:
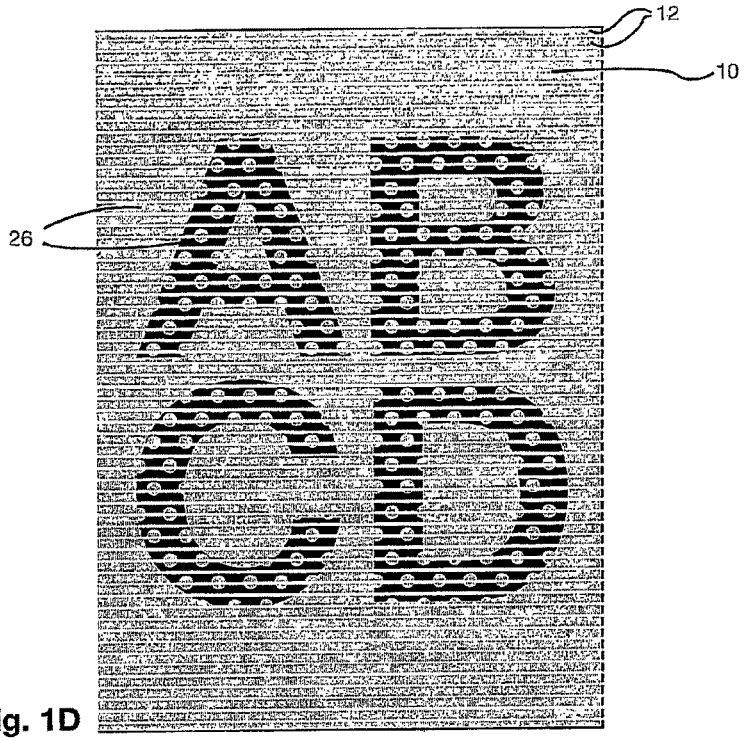
FIG. 1D is a view of one side of a vision control panel with a design ABCD.
Figure 1F:
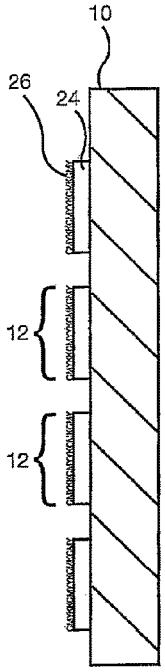
FIG. 1F is a cross-section through the same vision control panel as FIGS. 1D and 1E.
Figure 1E:
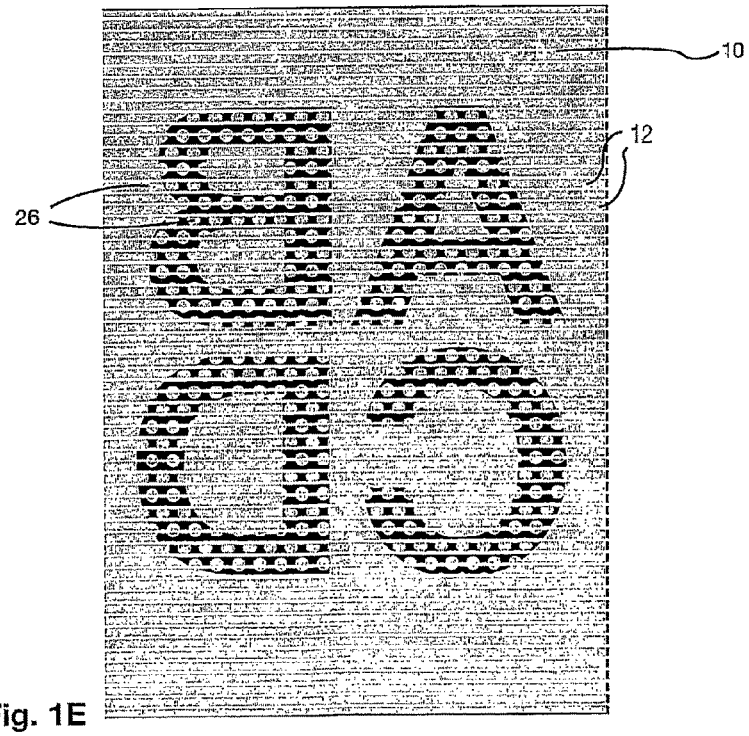
FIG. 1E is a view of the other side of the same vision control panel as in FIG. 1D, from which the design is not visible.

FIGS. 1D, 1E and 1F illustrate a vision control panel according to EP 0 880 439 comprising a translucent, typically white base layer 24 and typically a four or six colour process translucent design layer 26. In FIG. 1D, the design layer 26 is visible from one side of the panel and a reverse or mirror image of design layer 26 is visible from the other side of the panel. The design can be illuminated from the other side of the panel for the benefit of an observer on the one side of the panel. An observer on either side can typically see through the panel to some degree from either side but with less clarity than through the other side of a one-way vision panel of FIG. 1B. The cross-section of FIG. 1F illustrates white base layer or layers 24 and the design layer 26 within the print pattern 12.

Figure 2:
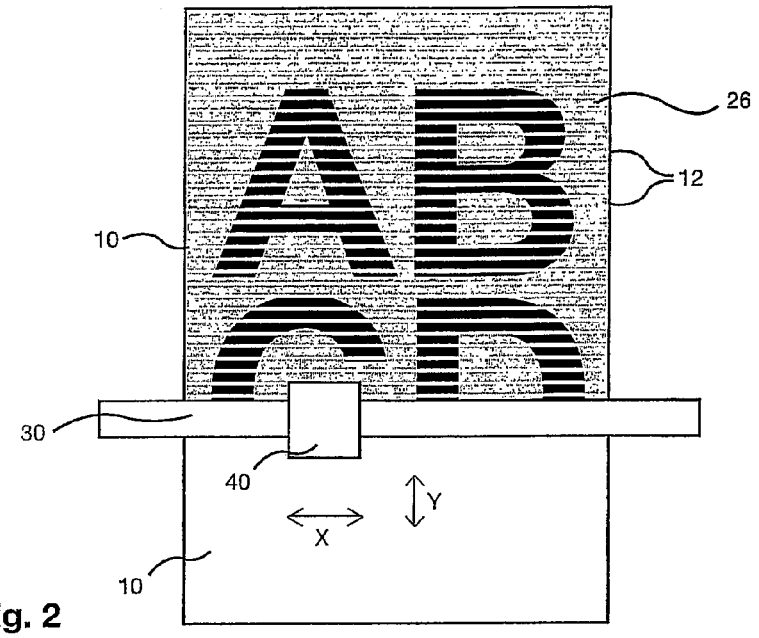
FIG. 2 is a diagrammatic plan of a digital inkjet printing machine.

FIG. 2 is a diagrammatic representation of a UV inkjet printer, either a flatbed machine in which the substrate (light permeable material 10) is held by vacuum suction onto a vacuum bed (not shown) or is being frictionally fed or otherwise fed under printhead array 40 which moved along "beam" or "guide" 30. All inkjet printers have a means of moving the inkjet printheads relative to the substrate and typically the printheads move in a printhead array or assembly along a "beam" or "guide" in a transverse or "X" direction, across the width of a web (roll-to-roll) of sheet substrate, and the beam moves relative to the substrate being printed in a longitudinal "Y" direction, along the length of the web or sheet substrate. The following inkjet printer Movement Mechanisms will be referred to herein:

Movement Mechanism 1: Printheads move incrementally in the X-direction along a fixed printhead beam, while primary movement is by a vacuum bed (with the substrate held to it) moving rapidly backwards and forwards in the Y-direction.

Movement Mechanism 2: Printheads move primarily (rapidly) across a beam in the X-direction and a vacuum bed (with the substrate held to it) moves incrementally in the Y-direction.

Movement Mechanism 3: Printheads move primarily (rapidly) across a beam in the X-direction, the beam moves incrementally in the Y-direction over a fixed vacuum bed with the substrate held to it.

Movement Mechanism 4: Printheads move primarily (rapidly) across a fixed beam in the X-direction, the substrate (either roll to roll or sheet) moving incrementally in the Y-direction, for example by frictional feed.

Initial movement or an initial pass of printheads in the X direction is referred to herein as r-l (right to left) and return movement as l-r (left to right) or return pass.

Individual printing machines may have combined mechanisms, for example UV inkjet machines manufactured by Leggett and Platt enable both Movement Mechanisms 3 and 4.

Frictional feed can incur slippage and skew of the substrate, leading to lack of registration in successive layers of ink. All mechanical movement between ink applications is subject to mechanical tolerance, leading to some lack of registration.

Figure 3A:
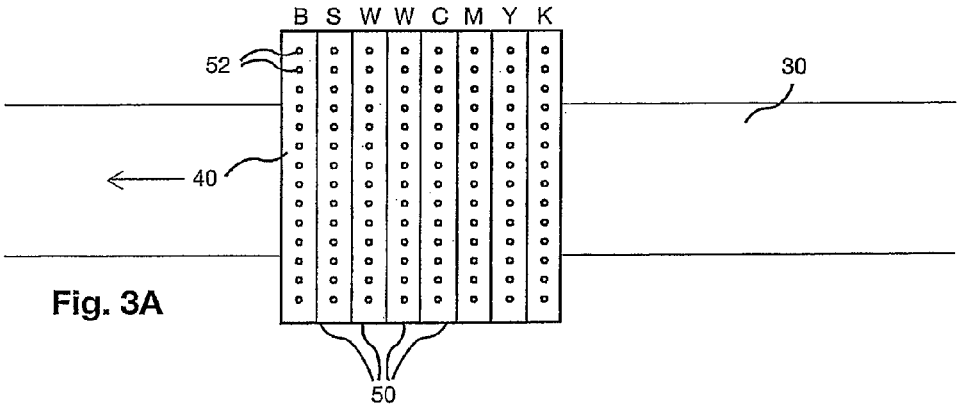
FIGS. 3A and 3B are diagrammatic representations of the underneath of a printhead array in different orientations.
Figure 3B:
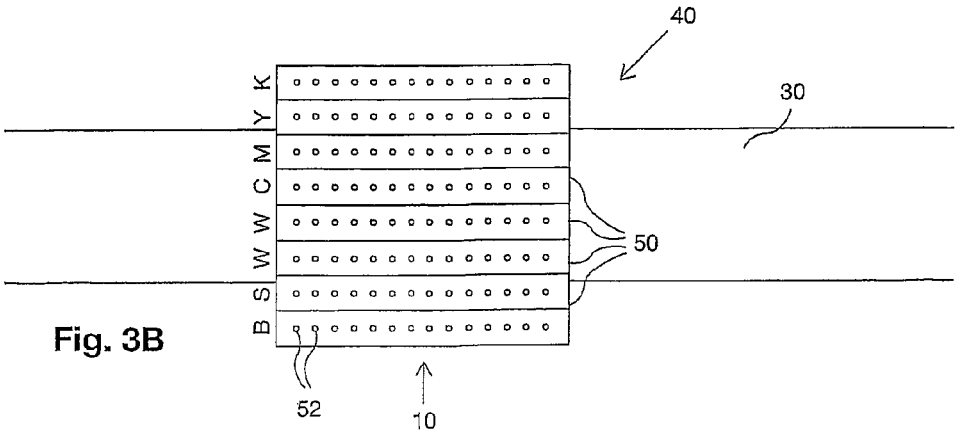

FIGS. 3A and B illustrate a notional printhead array 40 with printheads 50 each comprising a single line of inkjet nozzles 52, all the nozzles in a single printhead being connected to an ink reservoir, the printheads being notionally arranged in the sequence of printing B, S, W, W, C, M, Y, K. In FIG. 3A the printhead assembly is orientated to suite Movement Mechanisms 2-4 while in FIG. 3B the printhead assembly is orientated to suite Movement Mechanism 1. However, a conventional CMYK printhead array with an additional white colour in any position can be used for Printing Sequences 1-3, described below, as the different layers are separately software driven.

The method of the invention can be practised with different sequences of X-Y movement and printing of the desired layers. In any of the following Printing Sequences, the UV inkjet printing optionally includes multiple firing of individual nozzles and/or lateral oscillation of nozzles between their spacing centres or pitch, to achieve the desired distribution and thickness of inkjet deposits. All the Printing Sequences 1-6 are undertaken in one printing operation, without removal of the light permeable from the printing machine and with substantially no time delay between each stage of each Printing Sequence.

Printing Sequences 1-6 vary in the order of printing base layers and design colour layers. Printing sequences 4-6 typically require either amendment to standard inkjet printer configurations of printheads and/or a novel order of firing the inkjets nozzles and/or special software, compared to the conventional use of such machines.

A single application of digitally printed ink typically means the printing of:

(i) a single deposit or drop from an individual nozzle, or (ii) a simultaneous firing of a plurality of nozzles within a single printhead or stacked array of printheads, typically of a single coloured ink.

In printing a base layer, single applications of ink preferably result in overlapping deposits which cover the substrate or previous ink layer with at least one layer and typically with two or more layers where individual inkjet nozzle deposits overlap in order to cover all of the desired area or areas. The different layers are optionally applied by means of multiple passes or a single pass. The ink is ejected from the nozzles in one direction of primary movement of the printhead assembly relative to the light permeable material, so-called unidirectional or unitary application, or in both directions of primary movement, so-called bi-directional application. The shape of ink deposits is dependent on many factors, including flight distance from the nozzle to the substrate, angle of impact, speed of impact and ink viscosity, leading to potential defects in bi-directional application with a fixed print head array in the order CMYK or KYMC. The printing of base layers of required thickness with required uniformity can be assisted by successive lines of inkjet nozzles being offset within an individual printhead. Alternatively, successive printheads, each with a single line of nozzles, can be stacked in an offset geometric relationship. In a CMYK design layer, the order of application (for example C, M, Y then K) is important to the resultant visual effect. Bi-directional application typically requires special printhead architecture and/or firing sequence to enable a different order of printing the required colours in each direction.

Figure 4:
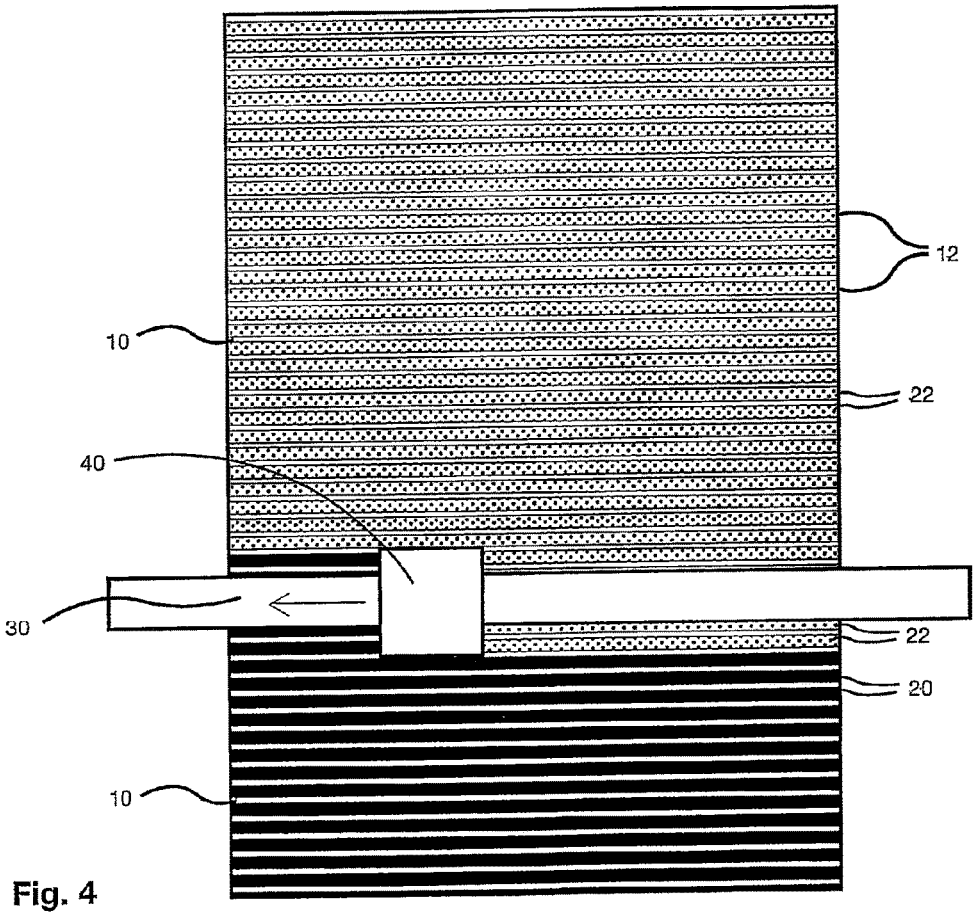
FIG. 4 is a diagrammatic plan of Printing Sequence 1.

In Printing Sequence 1, a base layer is printed over the whole of its area or areas in one stage. This requires mechanical movement in both the X and Y directions over the area of the panel covered by the base layer, typically over the whole area of the print pattern, before sequentially printing the other layer or layers. The software first instructs the black ink nozzles to print the whole print pattern in one layer onto the light permeable material. The black layer is a substantially opaque black layer B or a translucent process black layer K applied in one pass or multiple passes, and/or a combined CMYK dark, light-absorbing layer. Optionally, the software then instructs silver(s) ink nozzles to print the whole print pattern in one layer directly over the black layer. FIG. 4 illustrates a plan view of light permeable material 10 having been printed over the whole area of the print pattern 12 with black base layer 20 and partially printed with a silver base layer 22. Typically, the software then instructs the white ink nozzles to print the whole print pattern in one or more white layers, to achieve a suitable white thickness, hue, lightness and colour saturation as a background to the CMYK design. The CMYK design layer is then printed over the white base layer throughout the area of the print pattern. This Printing Sequence 1 has the disadvantage of requiring successive mechanical movements of the printheads over the whole panel area, typically causing some lack of registration between the successive layers of ink, and is not possible with UV digital inkjet machines that do not offer reverse movement in the direction of the web of a roll to roll substrate.

Figure 5:
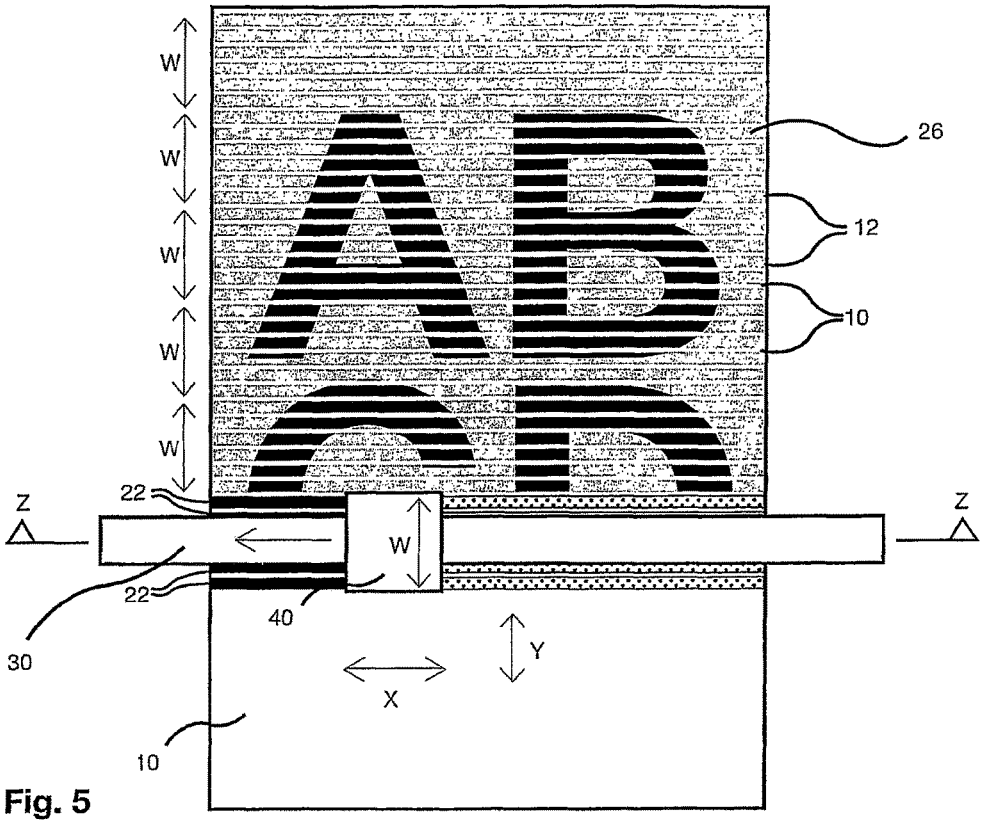
FIG. 5 is a diagrammatic plan of Printing Sequence 2.

Printing Sequence 2 is similar to Printing Sequence 1 in that all the base layers and the design layer are printed separately but Printing Sequence 2 limits the area of sequential application to a section or part of the overall area of the print pattern, typically a selected width of application along the whole extent of the panel in the direction of primary movement of the printheads, as illustrated in FIG. 5. For maximum efficiency of this Printing Sequence 2, the print pattern 12 is printed in widths "W" encompassed by the width of the array of inkjet nozzles in the printhead assembly 40. Registration is therefore typically better than with Printing Sequence 1, because of the reduced relative movement of the printhead assembly 40 and light permeable material 10 between successive layer applications, which is limited to one axis of printhead movement. A particularly advantageous example of this method is to print a print pattern of lines which run parallel to the primary direction of movement of the printheads. In FIG. 5, the primary, rapid direction of movement is of the printhead assembly 40 along beam 30, in direction X. Thus, the edges of each line are printed with no movement in the secondary or incremented direction of movement of the printhead assembly 40 relative to the light permeable material 10, potentially achieving more consistent registration of the edges of the lines than Printing Sequence 1. A further enhancement of this method is achieved if the mutual boundary between successive groups of lines, following relative movement of the printhead assembly and light permeable material in the secondary direction of travel, is located within a gap between two adjacent lines, avoiding problems of mutual interference such as "crosstalk", "interlacing" or other problems of overlapping or leaving a gap at a mutual boundary within a printed area or areas of the print pattern, often referred to as "banding". Preferably, the printhead assembly is moved incrementally in the secondary direction of movement by the print width W between the outer edges of the two outermost lines in a plurality of lines being printed, plus the gap between the lines, further reducing the time of printing compared to printing print widths with a mutual boundary. Such line edge registration can be described as substantially exact registration, as lack of registration between layers is largely limited to lateral machine tolerance in the movement mechanism in the primary direct ion of movement, inkjet alignment, dot gain or shrinkage and any other causes of "spatter", being a term referring to an uneven printed edge which may result from a variety of secondary causes.

Figure 6:
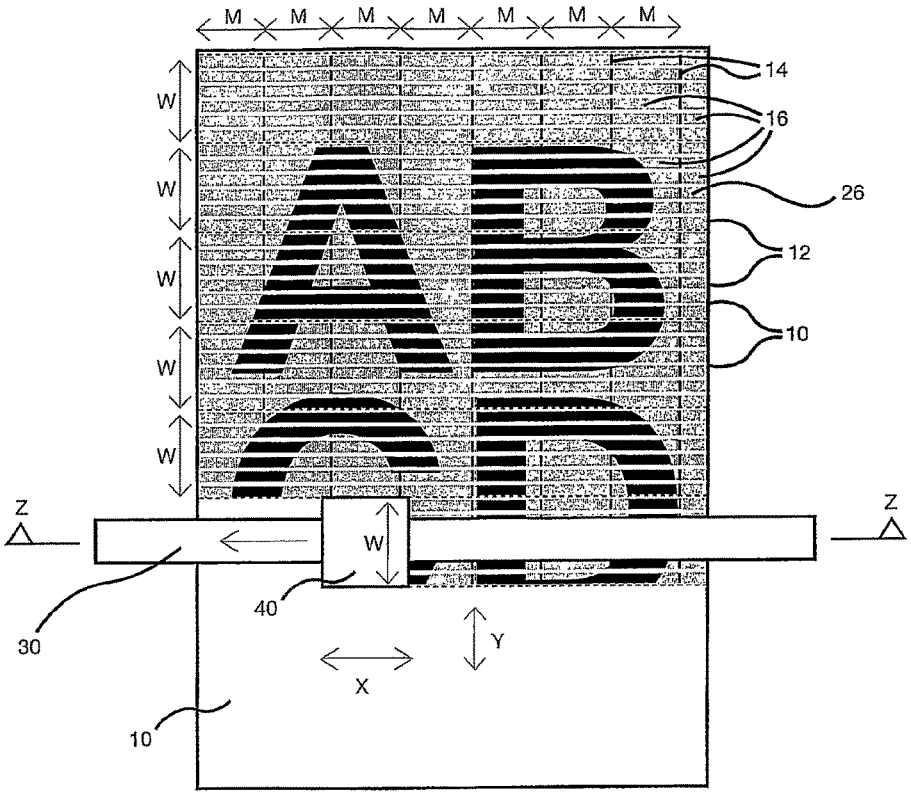
FIG. 6 is a diagrammatic plan of Printing Sequence 3.

In Printing Sequence 3, "micro-areas" of the print pattern are sequentially printed, as illustrated in FIG. 6, illustrating micro-areas 16 of width W and movement distance M. "Micro-areas" are typically encompassed by the area covered by the printhead array, the movement required between the application of different layers being limited to the spacing of individual colours within the printhead array. In printing Sequence 3, at the mutual boundary 14 between two micro-areas, there will be some overlap or gap between the succession of layers within the two adjacent micro-areas, owing to the impossibility of exactly registering abutting adjacent layers, owing to individual dot shapes, dot gain or dot shrinkage for a particular ink on a particular substrate and the inevitable mechanical tolerance of the movement mechanism of an individual printing machine, for example in the angles and spacing of individual nozzles, and in the X-Y movement.

Printing Sequences 1, 2 and 3 enable multipass printing of each layer and can be achieved by sufficient ink stations and software manipulation alone, for example a standard UV inkjet printer with CMYK and one or two white stations can be programmed to print a multiple K or CMYK black base layer, a multiple white base layer, followed by a CMYK design layer. Other causes of lack of registration, for example substrate absorption of the ink, and thermal and/or moisture movement of the substrate, are not significant with UV inkjet inks, a particular advantage over water-based, solvent-based or oil-based inks, which typically would require substantial X-Y movement and heating/air drying between layers.

Figure 7A:
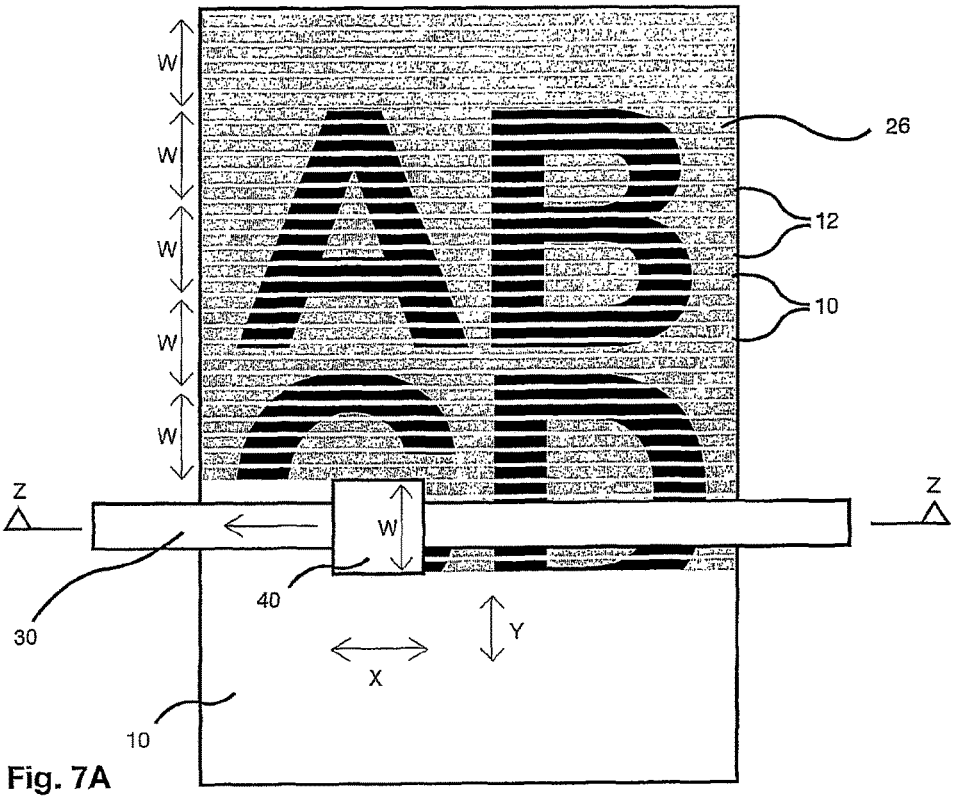
FIG. 7A is a diagrammatic plan of a digital inkjet printing machine.
Figure 7B:
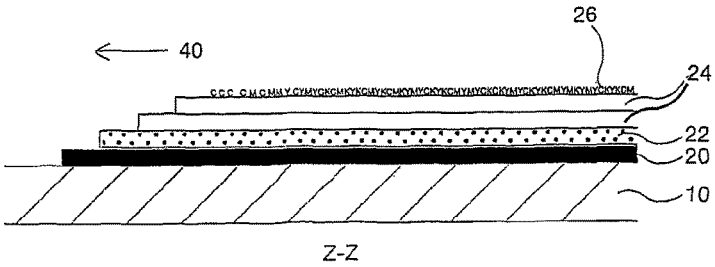
FIG. 7B is a cross-section along one of the print pattern lines of the vision control panel being printed in FIG. 7A and illustrates the printing of successive ink layers by Printing Sequence 4.

In Printing Sequence 4, each of the layers are printed in a single pass of the printhead assembly. Each layer is required to have the required substrate coverage and visual opacity achieved by this single pass. The individual colour printheads must therefore be in the required order of printing the individual layer colours in the printhead array, for example black, silver, white, white, C, M, Y, K. The printheads typically move slower, than with multiple pass printing, to ensure the required layer coverage and thickness. This Printing Sequence 4 provides the best exact registration of layers for any print pattern but a print pattern of lines parallel to the primary direction of printhead movement is still preferred, for example in lines perpendicular to the printhead beam with Movement Mechanism 1 and lines parallel to the printhead beam in Movement Mechanisms 2-4. FIG. 7A illustrates printhead array 40 which moves along beam 30 in the primary direction of movement in the X-direction, the printhead beam 30 moving incrementally in the Y-direction across the light permeable material 10 or the light permeable material 10 moving incrementally in the Y-direction under a fixed beam 30. The print pattern 12 is a pattern of lines running parallel to the printhead beam with design layer 26 comprising a design similar to that illustrated in FIG. 1A. The printhead array is arranged to enable firing of the required colour inkjet nozzles in the required order, for example FIG. 3A illustrates a notional printhead array 40 with printheads 50 each comprising a single line of inkjet nozzles 52, all the nozzles in a single printhead being connected to an ink reservoir, the printheads being notionally arranged in the sequence of printing B, S, W, W, C, M, Y, K. FIG. 7B shows the printhead array moving from right to left and building up the sequence of base layers and design layer in a single pass of the printhead assembly 40, the black base layer 20 being printed ahead of the silver base layer 22, which in turn is being printed ahead of the two white base layers 24, which in turn is being printed ahead of design layer 26 comprising individual design colour layers CMYK. Optionally, the printheads of black, optional silver and white are spaced from each other and the CMYK printheads to assist UV curing of each layer of ink. However, with currently available printheads on commercially available machines, the resultant perceived quality of a design printed with a single CMYK pass is relatively coarse and provides weak or low saturation perceived colours. While possibly suited to certain designs, for this Print Sequence 4, double, treble or quadruple lines of nozzles for each CMYK colour are preferable.

Figure 8A:
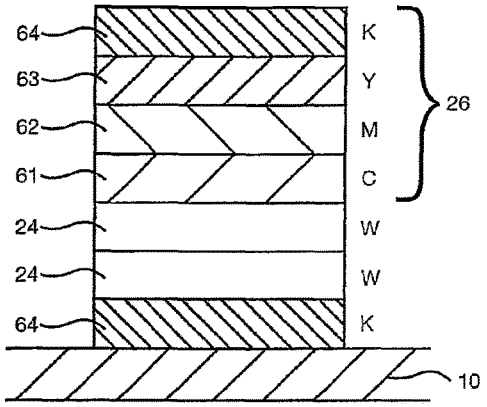
Figure 8B:
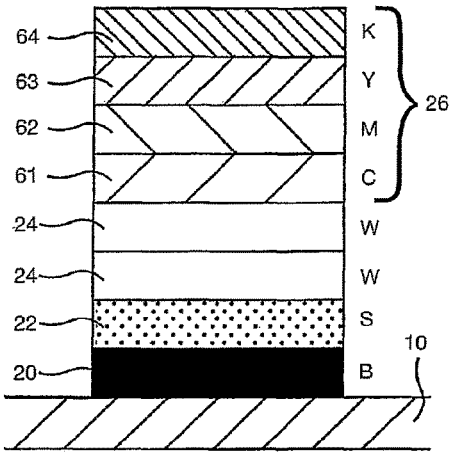
Figure 8C:
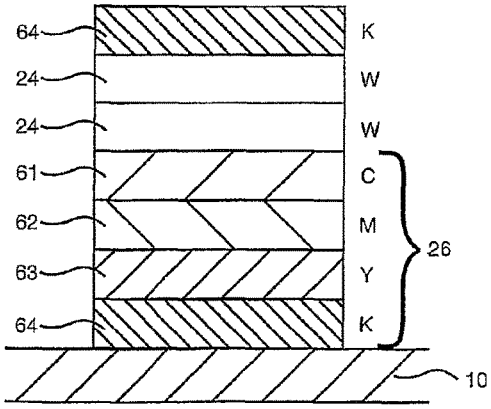
Figure 8D:
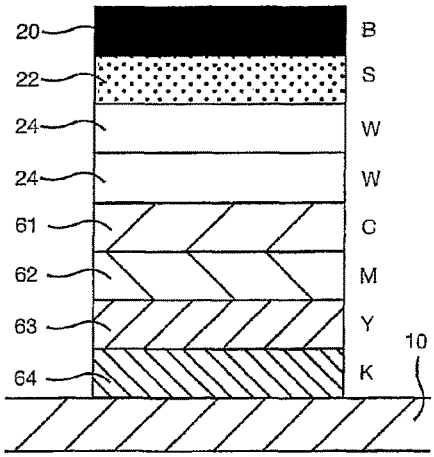
Figure 8E:
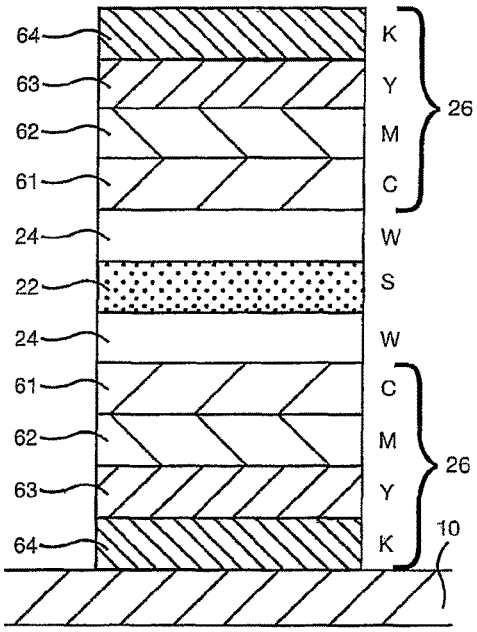
Figure 8F:
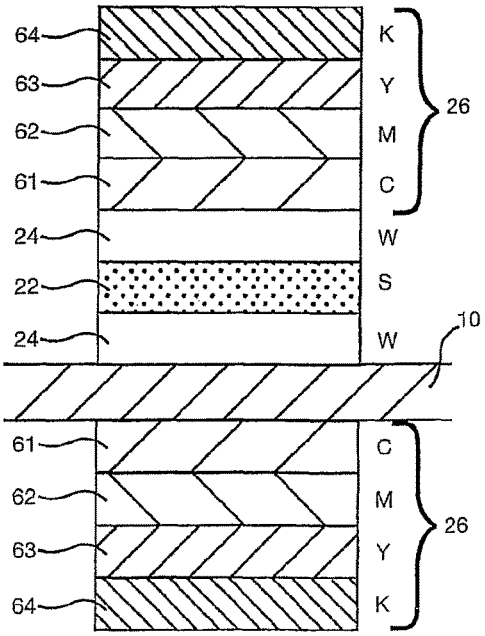
Figure 8G:
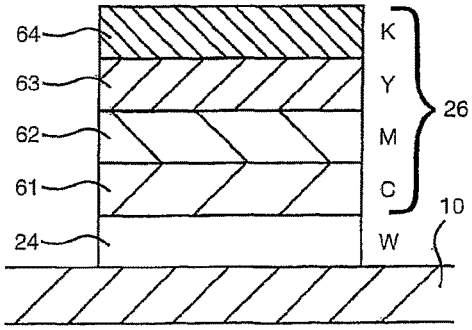
Figure 8H:
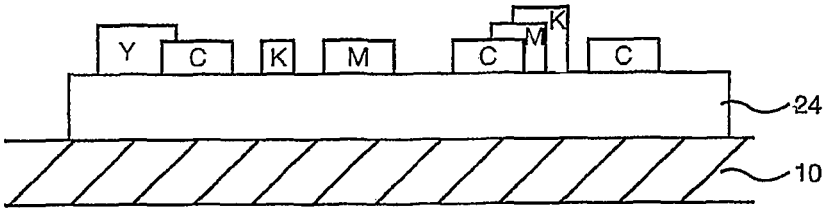
Figure 8I:
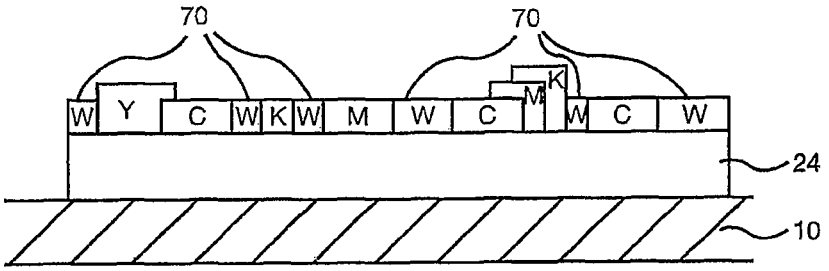
Figure 8J:
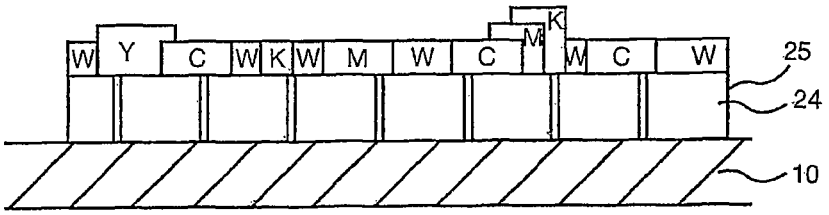
Figure 8K:
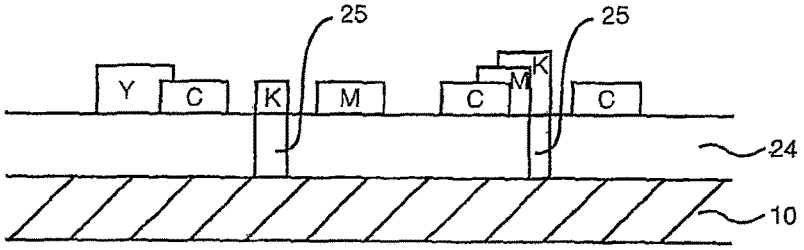
Figure 8L:
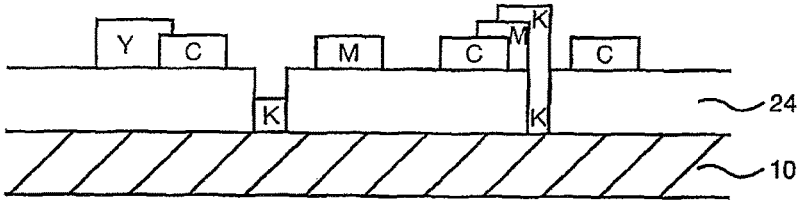
Figure 8M:
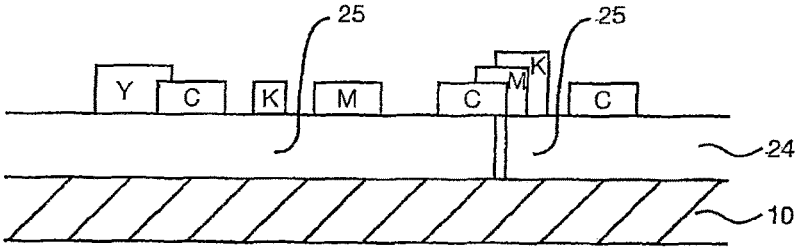
Figure 8N:
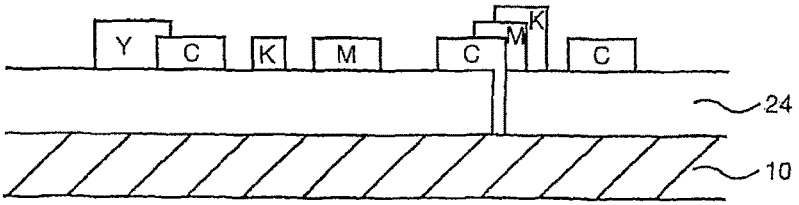

Printing Sequences 5 and 6 allow the printing of one or more base layers and a four or six colour process design simultaneously in a single pass, while allowing the required build-up of layers to make a range of vision control panels, for example as illustrated by cross-sections of individual portions of the print pattern, in FIGS. 8A-N.

FIGS. 8A-F illustrate example orders of layer printing for different types of vision control panels according to GB 2 165 292. FIGS. 8A and B represent one-way vision panels comprising transparent film 10, for example self-adhesive polyester film, to be applied to the outside of a window. In FIG. 8A, process black (K) base layer 64 is followed by one or more white base layers 24 with an optional silver base layer between the black and white layers, followed by design layer 26 comprising design process colour layers cyan 61 (C), magenta 62 (M), Yellow 63 (Y) and process black 64 (K). FIG. 8B illustrates spot colour opaque black layer 20 (B), silver layer 22 (S), two white layers 24 (W) and design layer 26 as in FIG. 8A.

FIGS. 8C and D represent one-way vision panels, for example comprising self-adhesive film, to be applied to the inside of a window. In FIG. 8C, design layer 26 is a mirror image or reverse-reading design comprising design colour layers which are also printed in reverse order KYMC. Following application to the inside of a window, the design is visible to an observer outside the window as right-reading. The design layer 26 is followed by white and process black layers 24 and 64. FIG. 8D illustrates a similar product but with an opaque black layer 20 (B) for improved vision out of the window. The blacker, more visually opaque and less light-reflective the black layer is, the better an observer inside the window of a building or vehicle can see through the window.

FIG. 8E represents a panel according to GB 2 165 292 with one design layer 26 printed reverse-reading onto the transparent material, visible through the transparent material, white, silver, then white base layers 24, 22 and 24, followed by a right-reading design layer 26 visible from the other side.

FIG. 8F illustrates a panel with a design layer 26 printed on either side of a light permeable material 10.

FIG. 8G represents a panel according to EP 0 880 439 with white base layer 24 and no black or silver base layers. The same product of FIG. 8G is represented differently in FIG. 8H by individual deposits of cyan (C), magenta (M), yellow (Y) and process black (K) coloured UV ink on a portion of white base layer 24.

In FIG. 8I, the gaps between individual deposits of design layer process colours CMYK have been infilled by white infill layer 70, which has the effect of producing a visually brighter white in white areas of a design or to be seen in combination with CMYK deposits to produce the visually required perceived range and gradation of design colours.

Whether the design layer is infilled with white or not, FIG. 8J illustrates that a base layer, for example white base layer 24, optionally comprises a regular or irregular pattern of voids or gaps 25 in the base layer, for example to achieve a particular design effect or increase the translucency of the panel overall.

FIG. 8K is a diagrammatic representation of a novel means of improving the rendition of dark areas in panels having a transparent or translucent substrate 10 and a white base layer 24 as background to a translucent multi-colour process design layer comprising CMYK process colours. In such panels (see-through graphic panels or otherwise), process black K is translucent and, when seen against a white background, is perceived as dark grey rather than black. To improve the blackness, CMY deposits are often applied over an area required to be black or otherwise very dark. On a transparent substrate with a white base layer, the white base layer is advantageously removed from under any area where process black is deposited on its own, by leaving voids or gaps 25 in the white base layer 24 coincident with the deposits of process black K, as illustrated in FIG. 8K. FIG. 8L illustrates the same panel but with the process black K deposits on the light permeable material 10 where there are voids in the white base layer 24.

Conversely, where the desired digital representation of dark colours results in a RIP requiring, say, superimposed layers of process black and cyan, magenta and yellow, the known method of "undercolour removal" is often used to reduce the number of superimposed layers of ink, for example to assist the curing of the ink layers and to reduce ink costs. FIG. 8M illustrates a void 25 in the white base layer only where the criteria for undercolour removal are satisfied, for example where at least layers C, M and K deposits are superimposed, illustrated more realistically in FIG. 8N, showing the gap or void 25 in FIG. 8M being filled with ink deposited on light permeable material 10.

In practice, the nozzle and printhead arrays are configured to print a particular range of products to the desired quality, efficiency and cost, taking into account whether they are to be printed in a unidirectional or bi-directional fashion, examples being illustrated in FIGS. 9A-H.

Figure 9A:
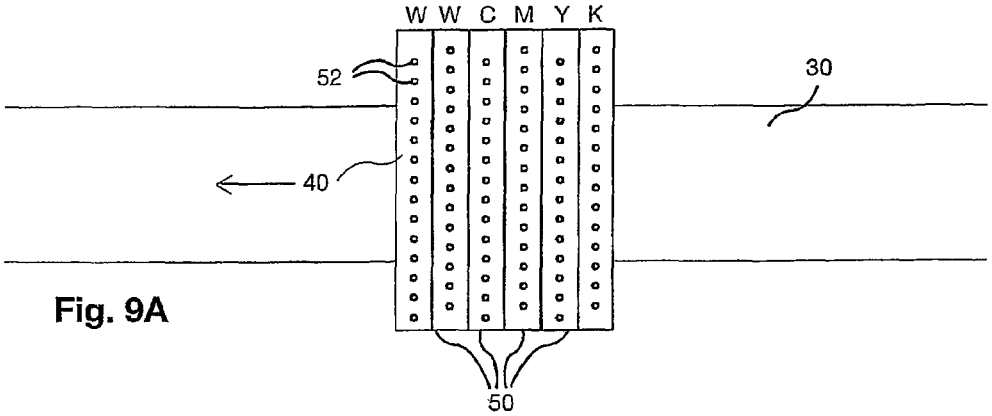
Figure 9B:
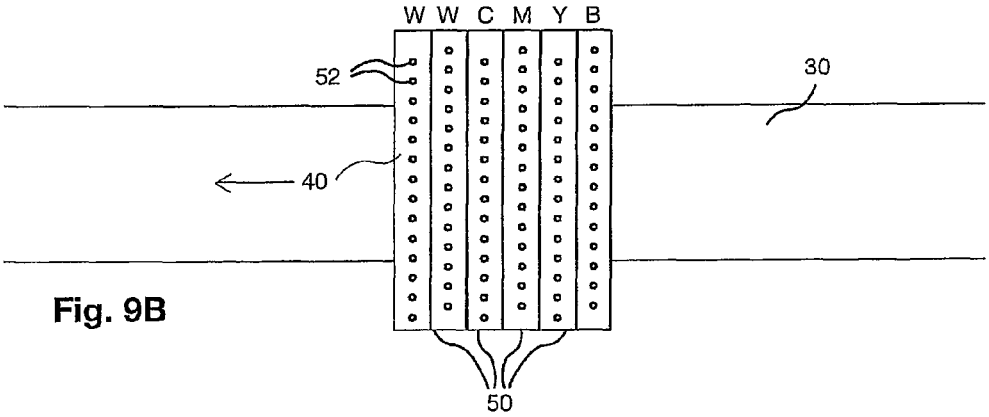
Figure 9C:
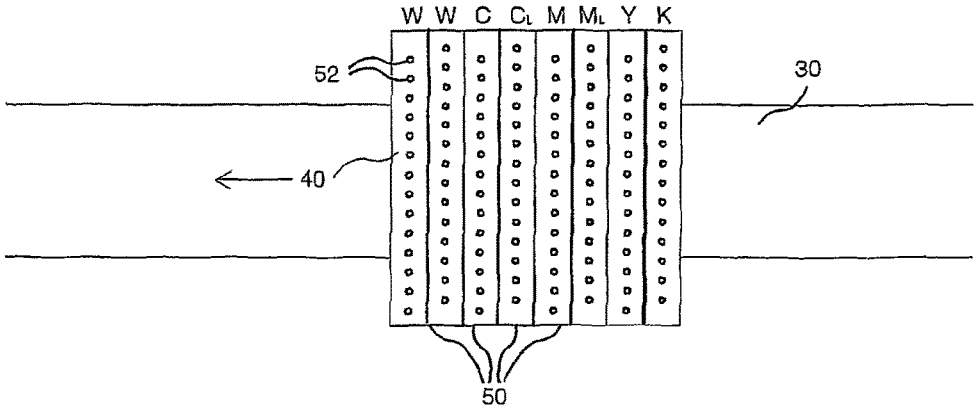
Figure 9D:
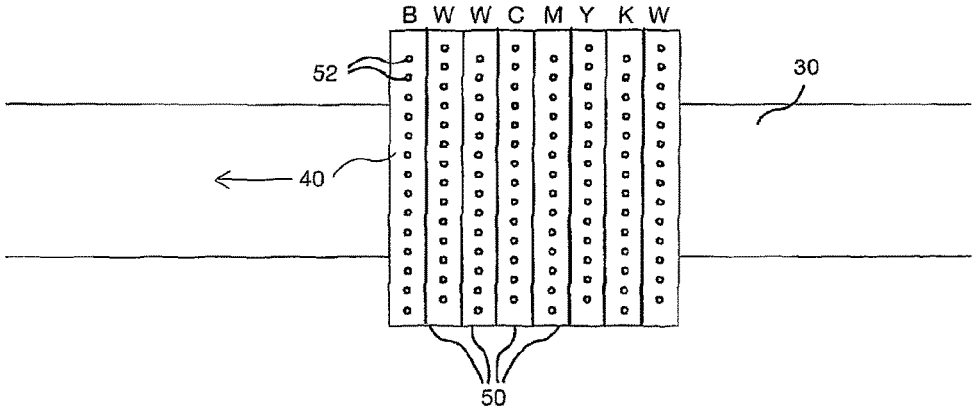

FIG. 9A illustrates a closely stacked printhead array 40 on beam or guide 30, each printhead 50 having a single line of nozzles 52, for example as provided in Spectra SE-128 printheads (Spectra, Inc., USA) having two electrically independent piezoelectric slices, each with 64 addressable channels, combined to provide a total of 128 jets. The nozzles are arranged in a single line, at a 0.020" distance between nozzles, the nozzle line length being 64.5 mm (2.54 in) six printheads for two white stations and CMYK, for example arranged WWCMYK, CMYKWW or WCMYKW, are practically the minimum number of printheads desired to practise the invention. Instead of a process black K, an opaque black B printhead can be used, as illustrated in FIG. 9B. Preferably an array of 8 printhead colours are available, for example as illustrated in FIG. 9C, with additional 6 colour process colours of light cyan ($C_L$) and light magenta ($M_L$) or, as illustrated in FIG. 9D, with additional opaque black B and white W stations.

Figure 9E:
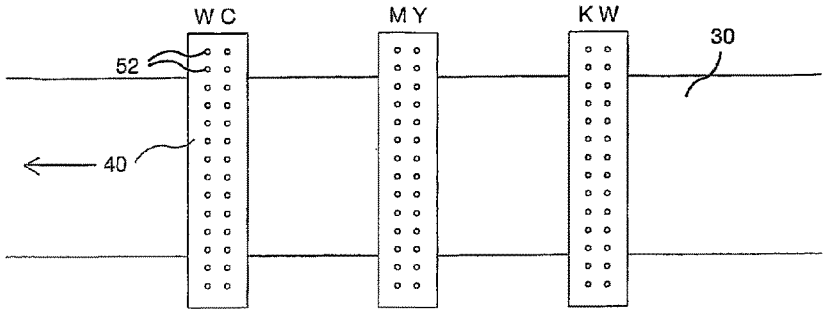
Figure 9F:
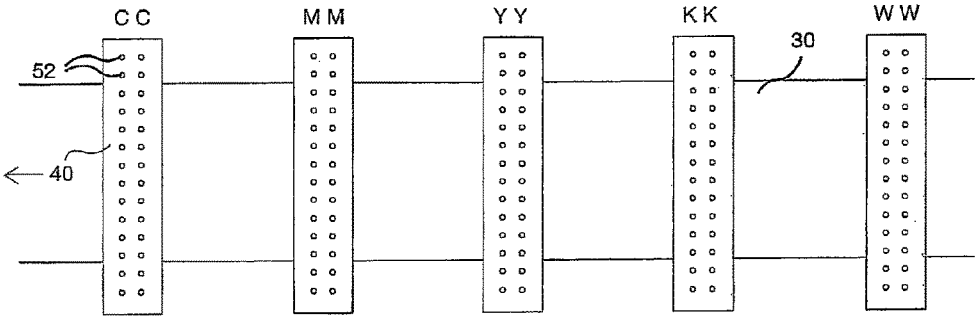
Figure 9G:
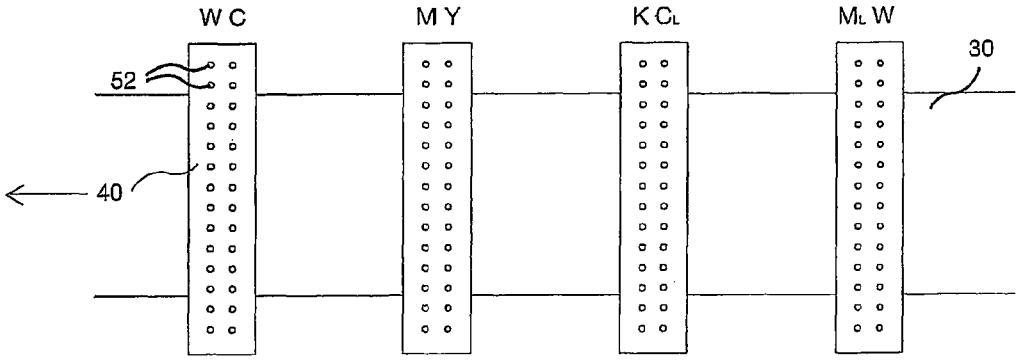
Figure 9H:
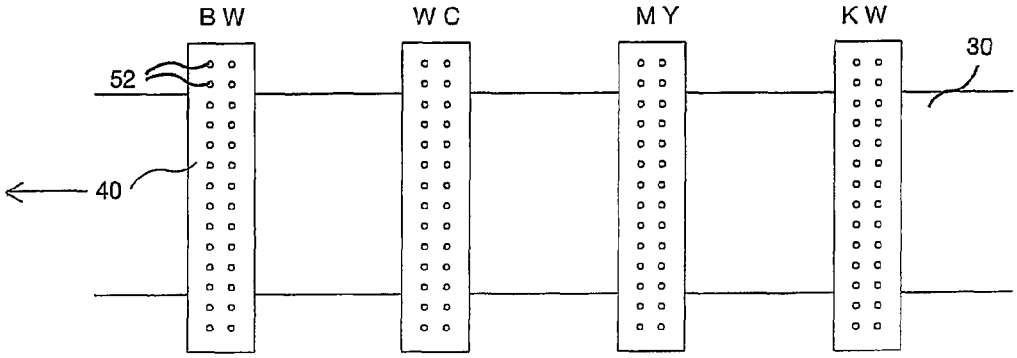
Figure 9I:
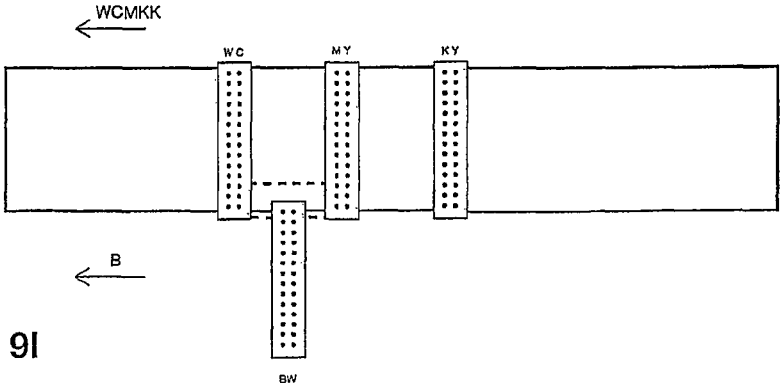

Alternatively, inkjet printheads have two lines of nozzles, for example as provided in Xaar Omnidot 760 printheads (Xaar Plc, UK) heaving two lines of 382 nozzles (764 total) across a printhead width of 86 mm. Dual line printheads can have separate colour supply, for example as illustrated in FIG. 9E, providing a basic WCMYKW array or single colour supply, as illustrated in FIG. 9F. FIGS. 9G and 9H illustrate optional configurations with four dual printheads, providing WCMYK$C_L$$M_L$ W and BWWCMYKW alternatives. For Printing Sequence 6, a printhead with opaque black B and white W stations intended for printing black and white base layers, is offset from and leading the other three printheads which are intended primarily for printing the design layer, as illustrated in FIG. 9I. In each sequence, each line of nozzles is connected to and is printing only one colour of UV curable ink. Only Print Sequence 1 requires an inkjet printing machine with a substrate rewind capability.

Figure 10A:
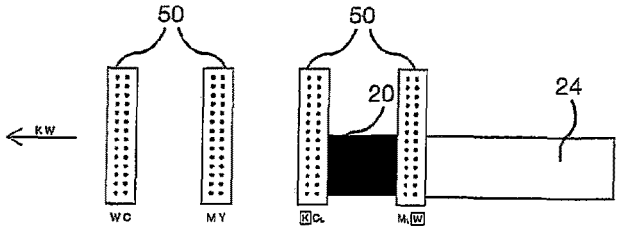
Figure 10B:
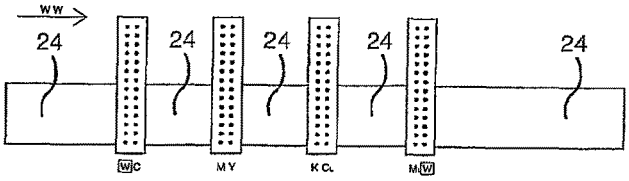
Figure 10C:
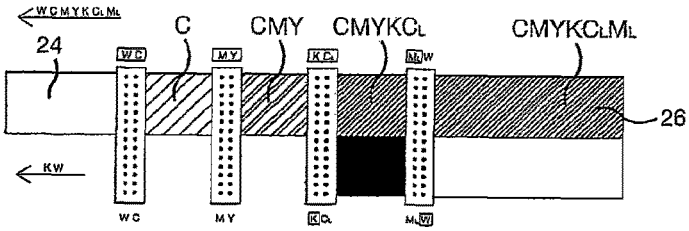
Figure 10D:
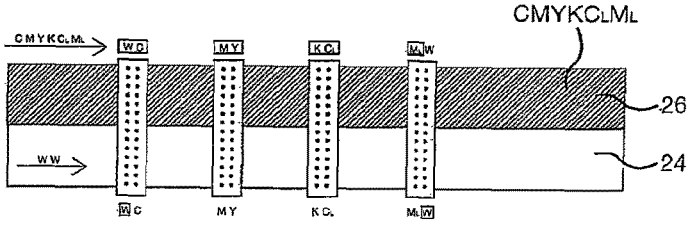

It is known to have in-line inkjet arrays of WCMYKW, as illustrated in FIG. 9E, or WCMYK$C_L$$M_L$W, as illustrated in FIG. 9G and FIG. 10A. These configurations are suitable for printing see-through graphics products with a white base layer and optional infill of white droplet deposits in any location in the design layer where there is not a CMYK deposit, according to FIGS. 8G-N. Typically, the first white inkjet deposits a single white base layer followed by the CMYK design layer and any white infill. If a less translucent, more opaque white base layer is required, two layers of white are deposited in a l-r pass, followed by an optional additional white base layer, followed by the CMYK design and optional white infill in a r-l pass.

Figure 10E:
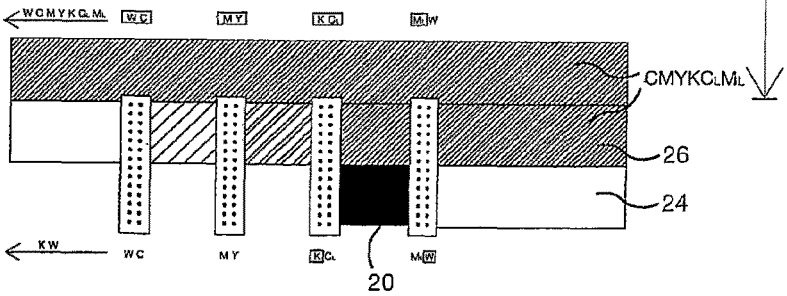
Figure 10F:
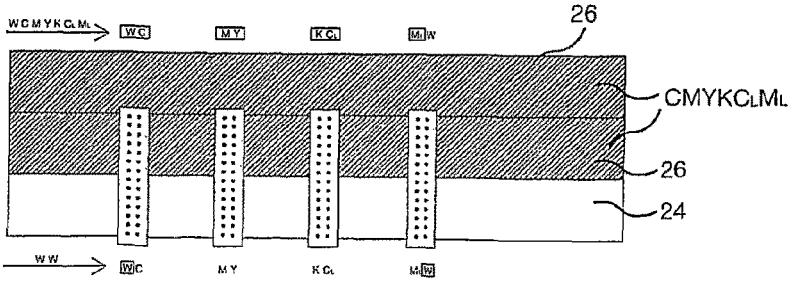
Figure 10G:
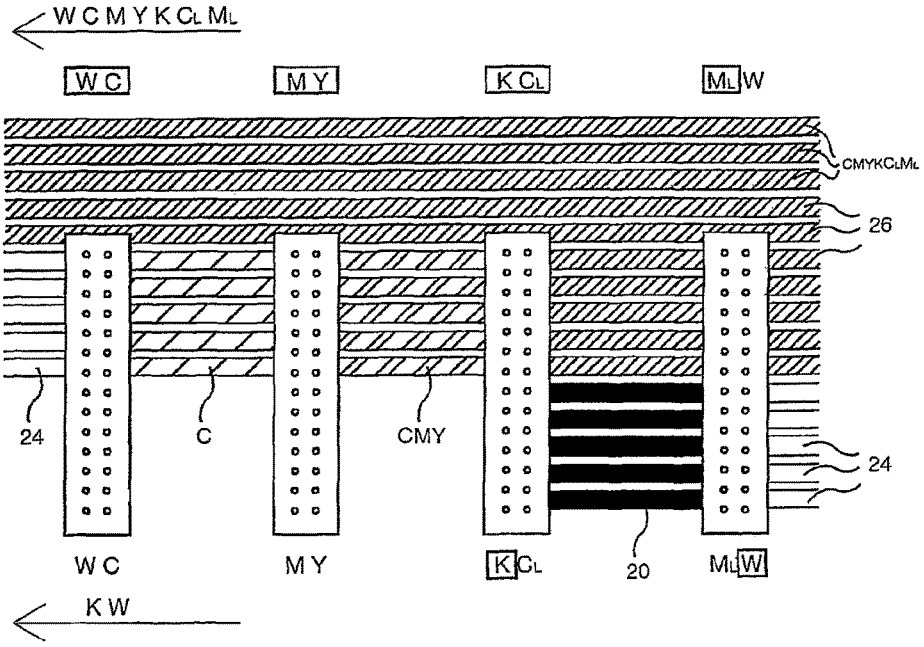
Figure 10H:
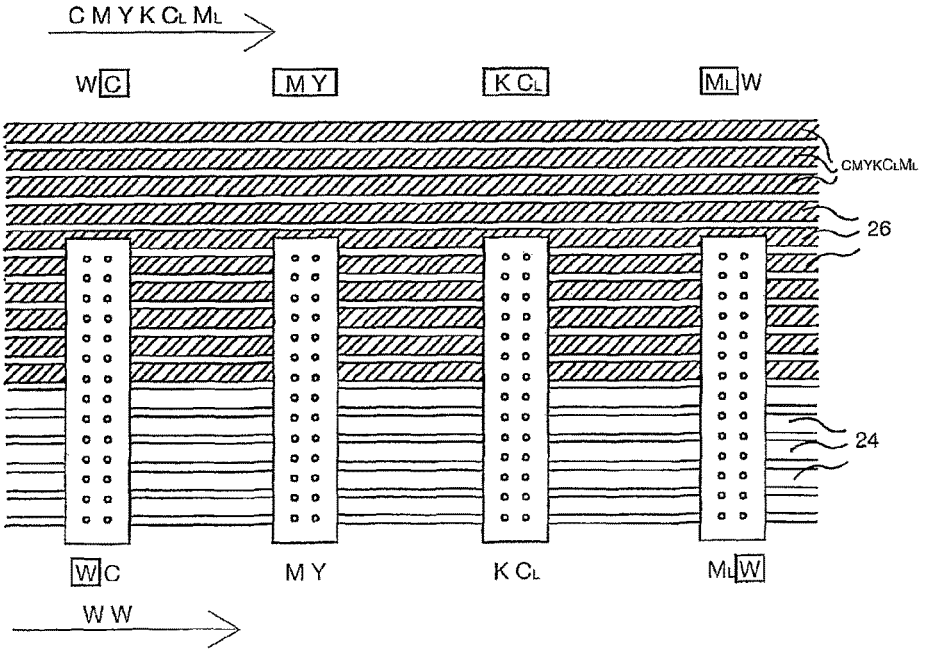
Figure 11A:
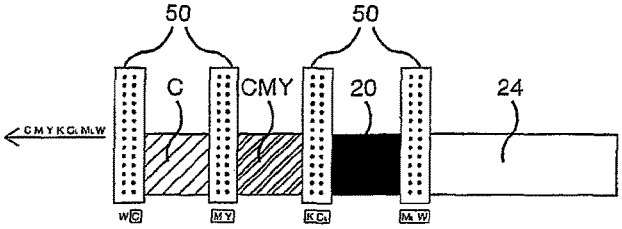
Figure 11B:
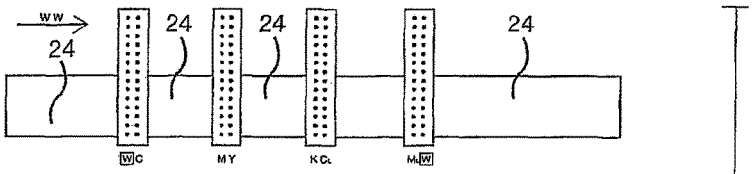
Figure 11C:
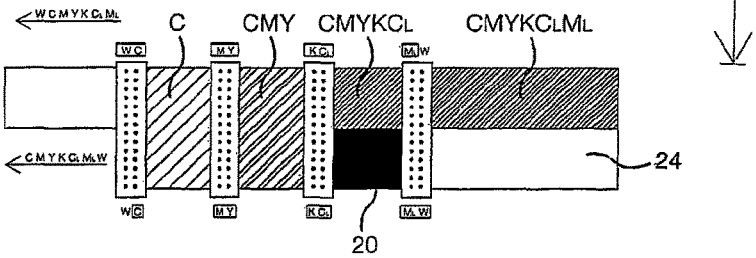
Figure 11D:
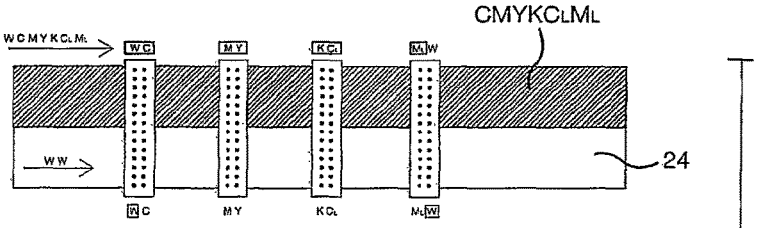
Figure 11E:
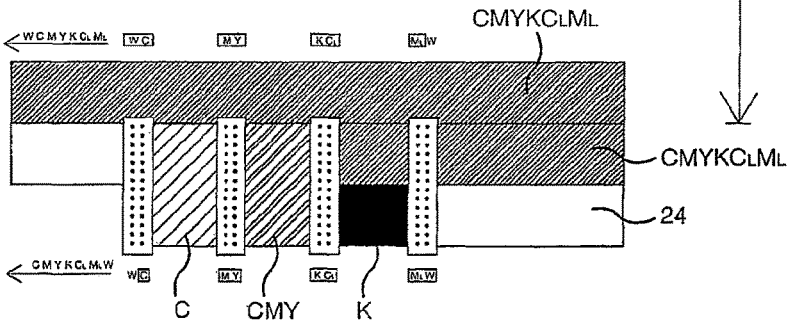
Figure 11F:
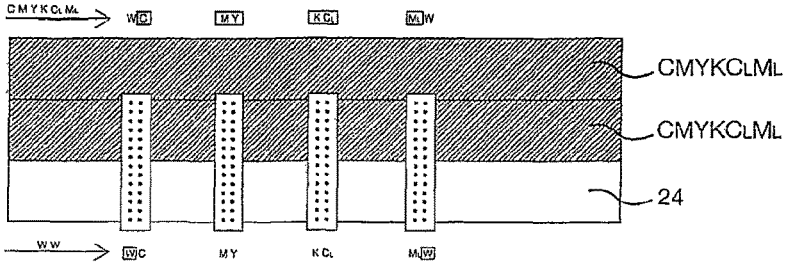
Figure 11G:
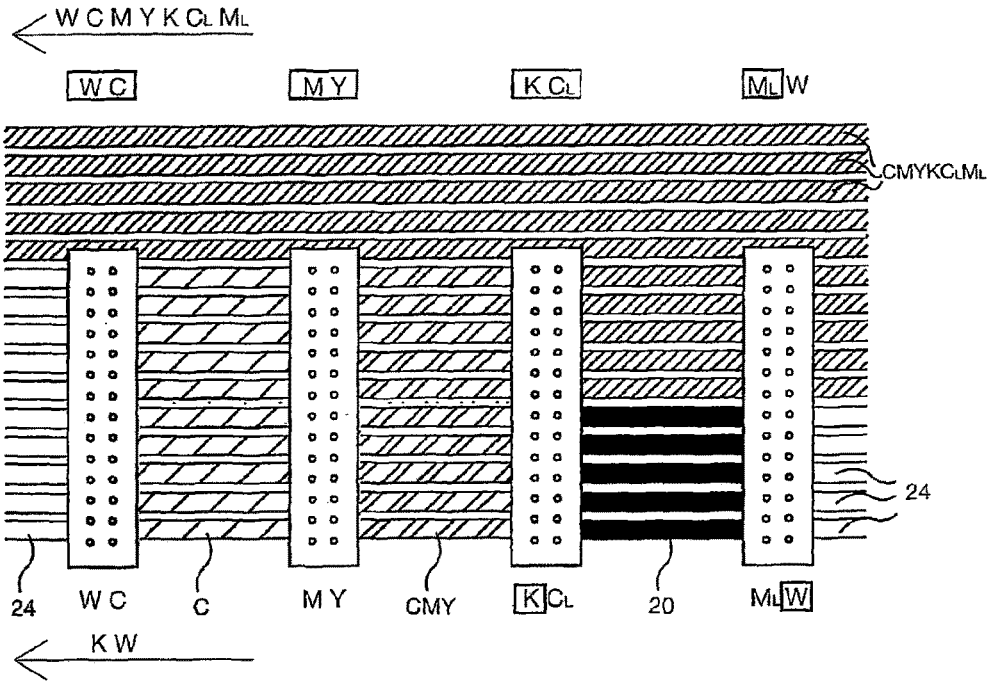
Figure 11H:
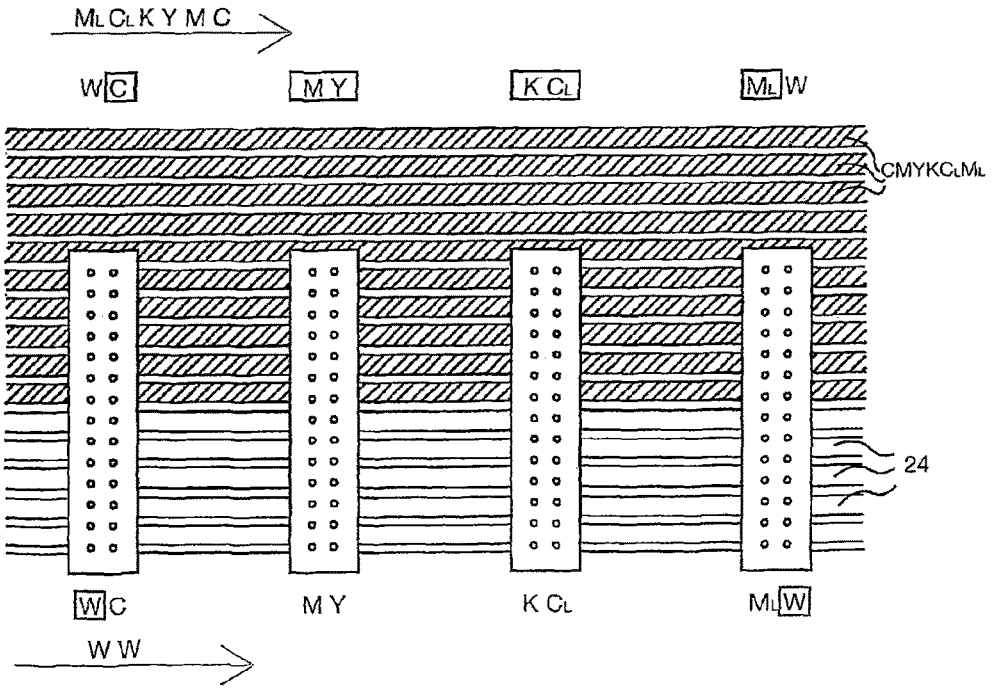
Figure 12D:
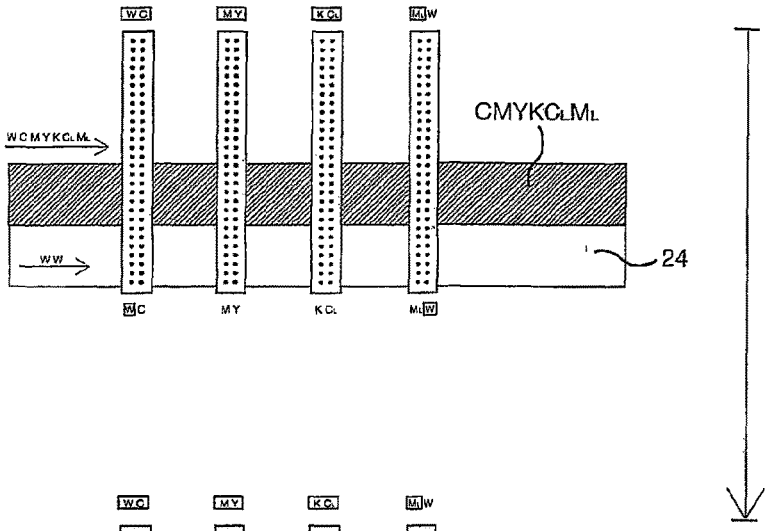
Figure 12E:
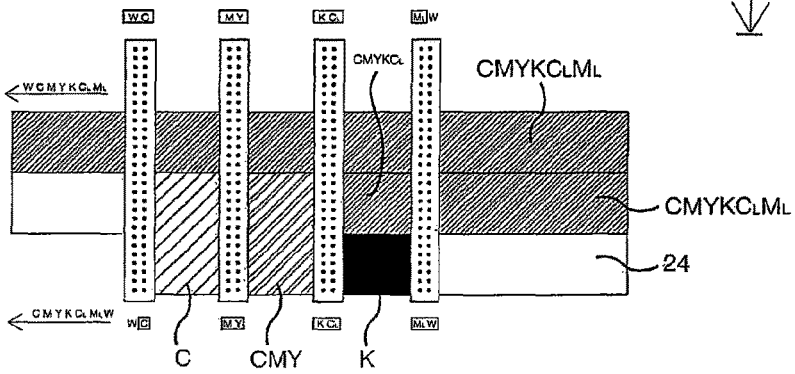
Figure 12F:
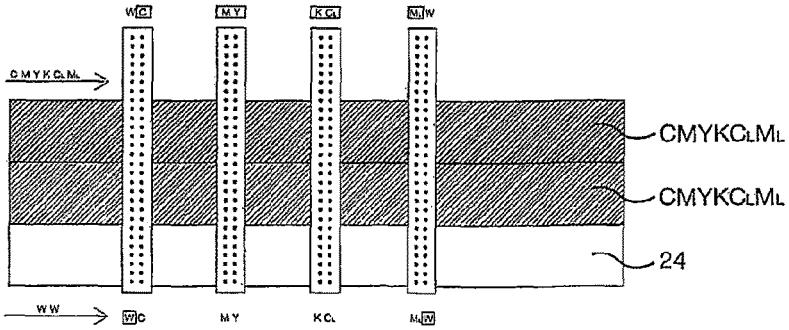
Figure 12G:
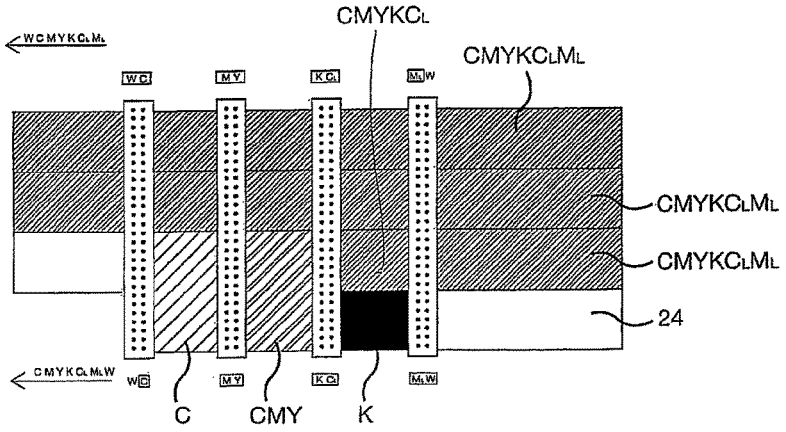
Figure 12H:
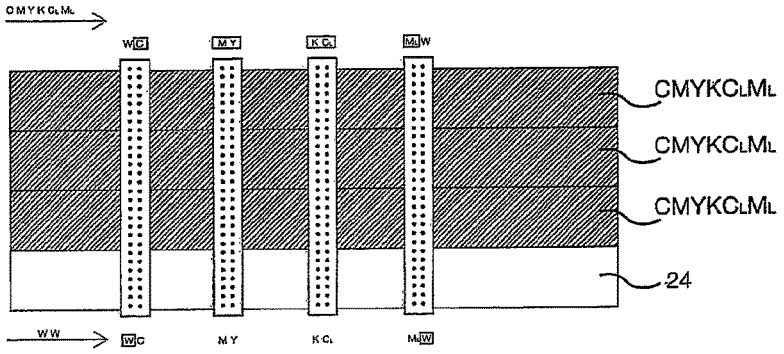
Figure 12I:
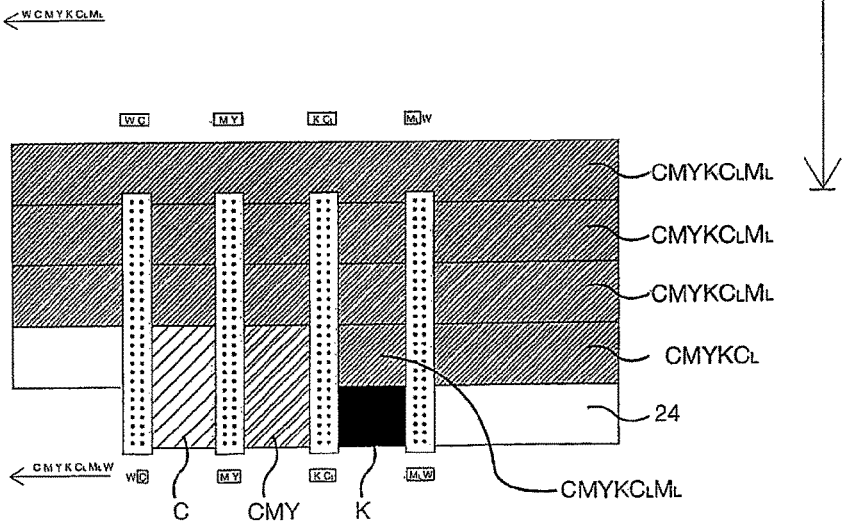

In order to print one-way vision see-through graphic panels according to GB 2 165 292, it is necessary to have a dark layer, typically black, to provide good through-vision from one side and a bright white background to design colours. It is typically necessary to have multiple layers of white with an optional intermediate silver layer in order to achieve this. According to Printing Sequence 5, it is possible with an in-line inkjet array of WCMYKW or WCMYK-$C_L$$M_L$W, as illustrated in FIG. 10A, to utilise a leading or forward section, channel, stream or slice of the lines of nozzles to print the black and white base layers, the remaining or trailing nozzles being used to print CMYK design layer, all in a continuous progression. In order to achieve a generally acceptable standard of a digital inkjet printed design, it is necessary for the CMYK inkjet heads to pass over each design area several times, typically between four and sixteen times, depending on the perceived resolution required. If the leading half or quarter of the length of printhead nozzles are dedicated to depositing the black and white layers, the remaining half or three-quarters of the width can be dedicated to CMYK. FIGS. 10A-F illustrate Printing Sequence 5A in which the leading half of the inkjet nozzles are dedicated to printing base layers and the trailing half are dedicated to printing the design layer. In FIG. 10A, the process black K and right hand white lines of nozzles are printing black base layer 20 and white base layer 24 in an initial r-l pass. In the return l-r pass of FIG. 10B, the leading half of both lines of nozzles with white ink apply two further white base layers 24. The printheads then move in the secondary direction an increment of half the width of the inkjet nozzle lines to the position of FIG. 10C, so that the trailing half of the nozzles are positioned over the width of the pre-printed process black base layer 20 and three white base layers 24. In the r-l pass of FIG. 10C the leading half of the nozzles repeat the printing of the base layers 20 and 24 as in FIG. 10A, whereas the trailing halves are printing an additional white base layer 24, followed by the CMYK-$C_L$$M_L$ design layer 26. An additional design layer of CMYK-$C_L$$M_L$ design colour layers is deposited in the l-r pass of FIG. 10D, together with, in the leading half, an additional two white base layers 24, in a similar fashion to FIG. 10B. This sequence progresses as illustrated in FIGS. 10E and F to provide overall double coverage of the CMYK$C_L$$M_L$ design layer 26. FIGS. 10G and H illustrate to a larger scale the printheads and surrounding partial imaging of the light permeable material 10 in a print pattern of lines in the direction of principal movement of the printheads. However the lines could be printed in a perpendicular or any other direction or a different print pattern, for example of dots or a print pattern leaving discrete areas of light permeable material, are optionally produced by this by this Printing Sequence 5A or any other of the Printing Sequences.

In the Printing Sequence 5B of FIGS. 11A-F, the C, M, and Y layers are used in conjunction with process black K, to produce a "composite black" base layer 20, which is more opaque and typically preferable for one-way vision panels according to GB 2 165 292. The FIGS. 11A-H are otherwise similar to FIGS. 10A-H.

If the leading quarter of the nozzles are dedicated to the printing of the base layers and the printheads progress one quarter of the width of the nozzle lines following each bi-directional pass, then six CMYK$C_L$$M_L$ impressions will be deposited on each part of the design, as illustrated in FIGS. 12A-I, Printing Sequence 5C. The deposition of layers in FIGS. 12A-D is identical to the deposition of layers in FIGS. 11A-D, except that the channels, streams or slices of print width are one quarter the overall width of the nozzle lines, instead of one half the width of the nozzle lines. FIGS. 12E-I show the progression of printing resulting in six design layer impressions.

Figure 13A:
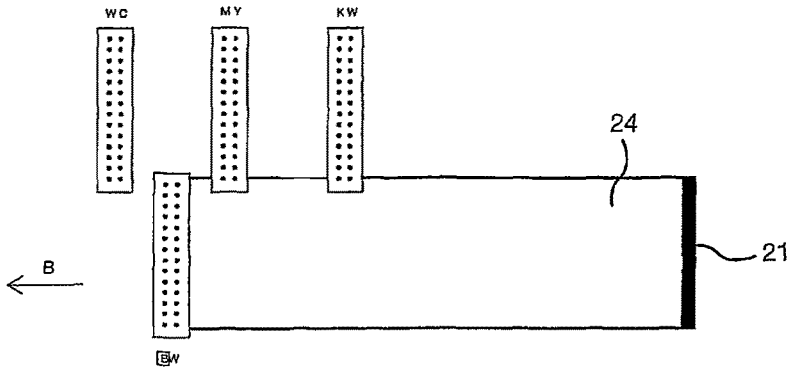
Figure 13B:
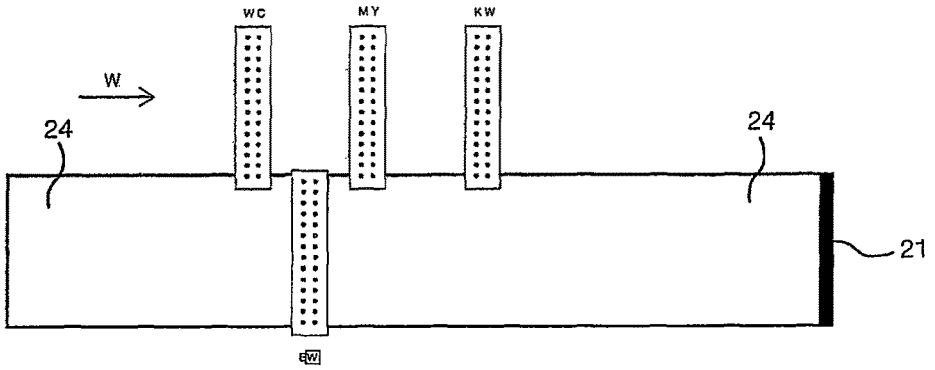
Figure 13C:
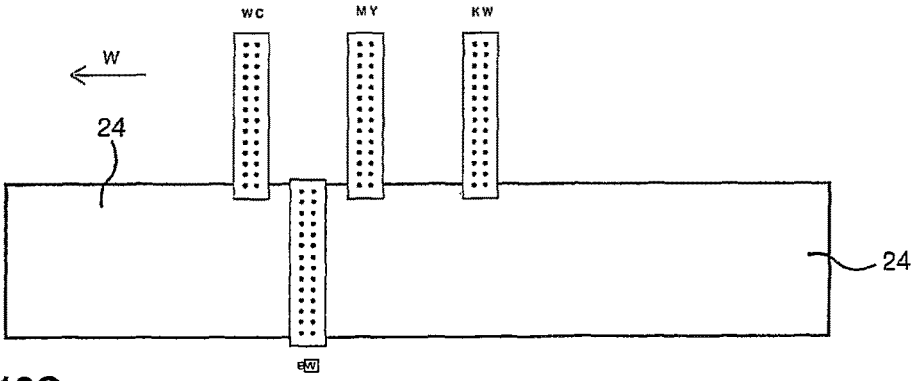
Figure 13D:
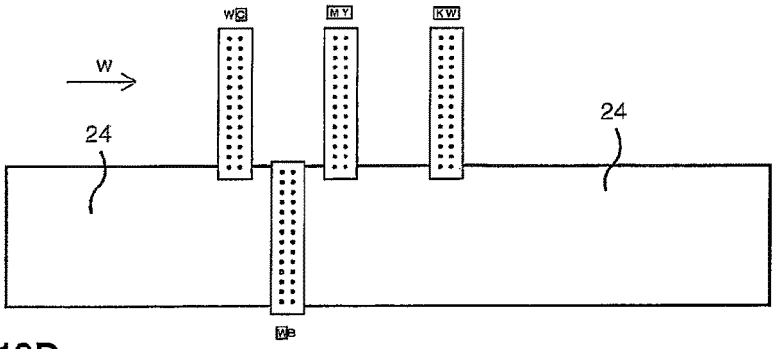
Figure 13E:
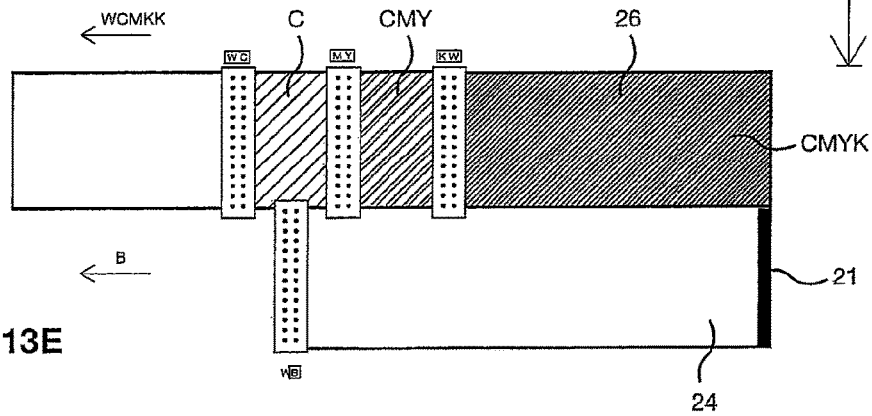
Figure 13F:
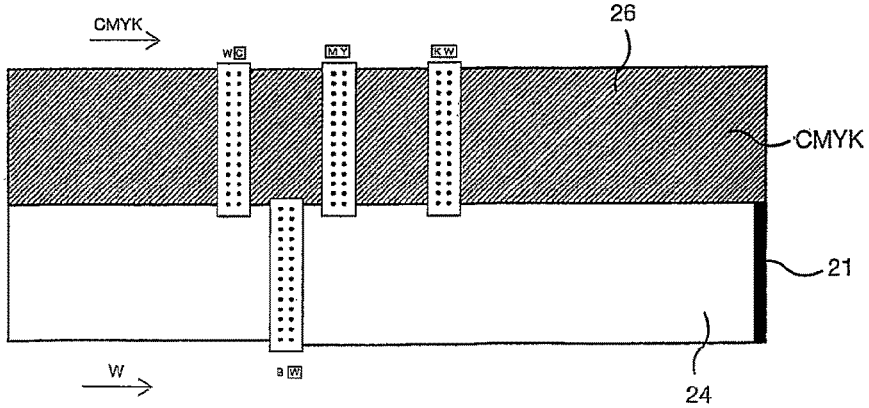
Figure 13G:
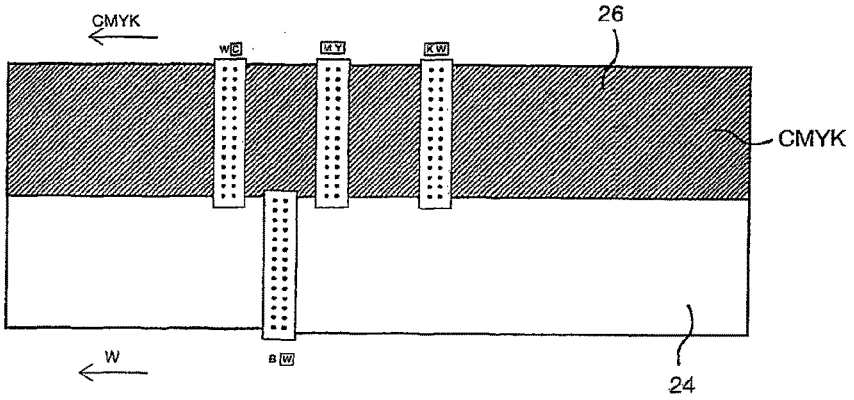
Figure 13H:
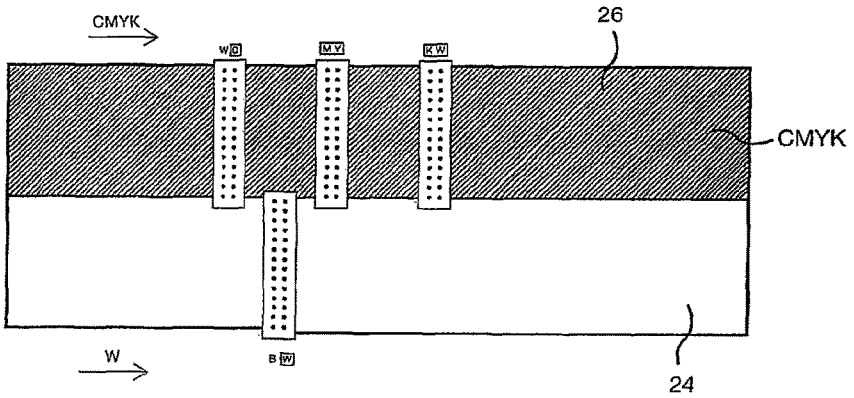
Figure 13I:
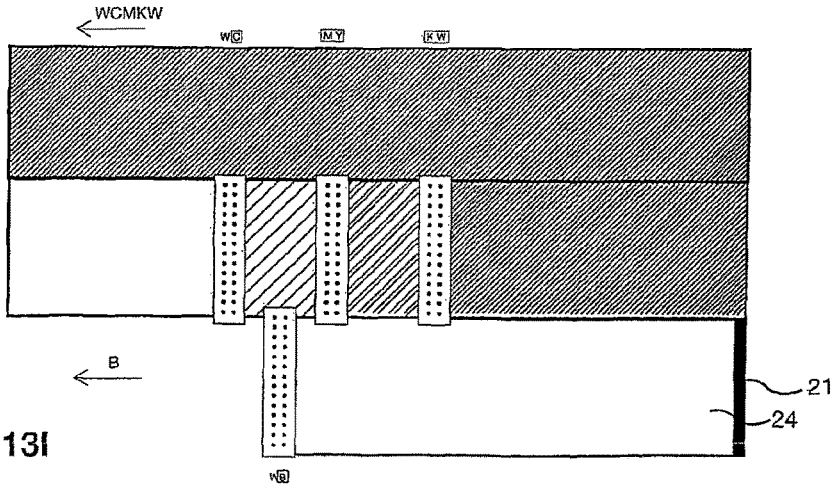

In Printing Sequence 6, one or more printheads printing the base layers are offset, forward from the printheads primarily intended to print the CMYK design colour layers, as illustrated in FIGS. 13A-I. For example, black B and white W ink nozzle lines in a printhead are offset ahead of an in-line array of a CMYK or WCMYKW conventional printhead array. In FIG. 3A, an opaque black base layer 21 and a white base layer 24 are printed in a first r-l pass, followed by a single white base layer 24 in a l-r pass, as illustrated in FIG. 13B. Two further white base layers 24 are added in the r-l pass of FIG. 13C and the l-r pass of 13D. The printhead beam is then moved incrementally by the width of the line of nozzles, such that the black and four white base layers of one printhead width are printed with a further white base layer 24 and the design layer colours CMYK on the trailing printhead width, as illustrated in FIG. 13E. The sequence of printing continues as illustrated in FIGS. 13F-I, to produce a sequence of one black base layer 21, five white base layers 24 and four CMYK design layer 26 impressions.

If a more saturated, apparently higher resolution design is required, more passes of white from the offset printhead and CMYK passes from the in-line printheads are carried out, for example to achieve 6×, 8× or more CMYK passes. Alternatively, for example, a single printhead of black could be offset in advance of two printheads of white, which are offset in advance of double CMYK printheads and a double white infill printhead, this third line of printheads being as illustrated in FIG. 9F.

It is advantageous to the method of the invention if the base layer colours of black and white, and the design layer colours, for example of cyan, magenta, yellow and process black, CMYK, are printed simultaneously in one pass of the printhead assembly.

The order of firing or order of sequential colour impulses is determined by the software programme or routine for particular types of vision control product. Printing Sequence 1, and thereby the potential of all Printing Sequences 1-6, was proven in test printing a clear, transparent polyester film substrate using a Mimaki UJF-605C digital UV inkjet printer and Mimaki inks, by printing an array of rectangular elements with transparent gaps in between, firstly with discrete, reverse-printed KYMC designs, followed by 2 layers of white, followed by a K layer black, proving all the required printing features of a see-through graphics panel including:

(i) a light permeable material
(ii) UV inkjet printing with 3 base layers (black and 2 white), and
(iii) UV inkjet printing a CMYK design.

The test was undertaken in one printing operation.

No special reconfiguration of the inkjet nozzles, heads or connections to ink reservoirs were required, simply data entry into the computer standard software to produce the process black, white and CMYK coloured layers in the required order. In this test production, the process black K and white layers had adequate opacity and whiteness to be design printed, and the designs were not visible from the other side of the panel.

Printing Sequences 1-4 and 6 do not require any special software or printing machine "firmware" (software for the printer's computer). However, Printing Sequence 5 requires the computer "firmware" logic to be reprogrammed to separate and manage the leading base layer channel of nozzles to print the base layers and limit the remaining, trailing channel to print the design layer.

In any of the above Printing Sequences of the method, of the invention, additional measures can be taken to improve the opacity of the white ink, for example a higher than typical percentage of white pigment, conventionally titanium dioxide, and optionally a finer white pigment particle distribution area, for example below a particle size of 1 micron. A special delivery system is required for white ink compared to other colours. The consistent opacity of the white ink can be assisted by continual stirring of the white ink reservoir throughout the print process and maintenance of an optimum temperature in the white ink reservoir and/or by temperature control of the printhead, to maintain the optimum rheology of ink to achieve an opaque white. The term "opaque white" is used herein to mean a white ink of sufficient "saturation", "lightness" and thickness to provide an appropriate background to print CMYK inkjet inks with the desired resulting perceived colours. UV inkjet inks typically comprise oligomers, monomers, photoinitiators, pigments and additives. It is preferable in printing by the method of the invention to reduce the additives in at least the base layer white ink and optional silver ink to increase the proportion of the other constituents to obtain inks that, if applied at a relatively high temperature, will cure efficiently and form more "opaque" ink layers of higher colour saturation. Additionally, it is advantageous to use UV-A lamps, more commonly used in screen printing to cure the ink. Also, in order to improve ink adhesion, it is advantageous to adopt inks to suit the surface energy of the particular light permeable material, typically transparent substrates used for the manufacture of vision control panels, for example print-treated polyester, PVC, acrylic and polycarbonate. It is also important to use flexible UV curable inks for filmic light permeable materials.

Drop on demand (DOD) printhead design considerations include (i) resolution and nozzle pitch,
(ii) drop ejection frequency,
(iii) cross talk,
(iv) life,
(v) filling/bubble removal,
(vi) drop placement accuracy,
(vii) latency, and
(ix) temperature control.

Drop placement or drops landing accuracy is dependent upon machine tolerances in:

(i) jet to jet manufacturing tolerances,
(ii) single jet with time variations,
(iii) nozzle straightness,
(iv) nozzle and surface wetting,
(v) nozzle plate contamination,
(vi) ink formulation and condition,
(vii) drop velocity, and
(viii) drop flight path and throw distance.

These variables and factors can be "tuned" to the particular requirements of inkjet printing vision control panels. The layout geometry of a printhead, sometimes referred to as the architecture, depends on the type of printer and target market. For example it is not necessary to have high resolution for large format outdoor advertisements, in fact large ink deposits at low resolution spacing is preferable for visual impact, a point often not understood by those specifying such printed materials. High resolution printing of the design is seldom required for vision control panels, in view of the relatively coarse nature of the unprinted portions.

The print defect of "banding" caused by jet misalignment or jet instability can be reduced by "interlacing", e.g. microweaving the nozzles. However, to produce substantially exact registered edges of a print pattern, as described herein, alignment of nozzles is typically preferred.

The greater the nozzle density in a printhead, the less the number of passes required in printing.

"Print quality" as used herein, refers to how closely the printed dot, on an individual or collective basis, resembles that intended. Print quality should be carefully monitored, for example to monitor edge spatter, which compromises the perceived registration of the print pattern edges.

"Image quality" as used herein, refers to how closely the final printed image resembles that intended. Perceived image quality is often easier to achieve in the production of vision control panels, because of the discontinuities of the unprinted portions, which tend to disguise other image defects.

Drop placement accuracy is principally dependent upon jet to jet manufacturing tolerances, nozzle straightness, problems with individual jet firing with time, dependent principally on nozzle and surface wetting and nozzle plate contamination, the X-Y movement tolerances and the throw distance tolerance of the printing equipment. Other problems include ink dot edge accuracy, dot gain or shrinkage and colour bleed. Printing Sequences 3 and 4 are both susceptible to colour bleed, especially black onto yellow. Colour bleed can be reduced by the use of oppositely charged colorants, for example cationic carbon black with anionic yellow dye.

The durability of a panel can be increased by printing clear ink or varnish in substantially exact registration within the print pattern. This should be restricted to the area(s) of the print pattern, as any printed layer, even if water clear, will have a deformed (not plane) surface and distort the through vision quality of see-through graphics panels.

It is preferable to establish the surface energy of any type of light permeable material being printed to assist the selection of an appropriate UV ink.

However, inkjet printhead design has been and will continue to be the subject of intense research and development to achieve higher quality and faster firing of inkjet droplets and resultant shapes and disposition of cured deposits. The desired single pass production according to the invention is assisted by the use of printheads which do not comprise a line of individual inkjet nozzles but instead a continuous slot with features which enable selective jetting of ink along the length of the slot, for example ToneJet™ printheads manufactured by IMI Europe Ltd, UK.

Typically, the number of ink stations are increased compared to a typical UV inkjet machine with 4 (CMYK) ink stations or CMYK with one or two optional "spot" colour ink stations. It is preferable for a machine to have at least eight colour printheads for the present invention, for example opaque black, silver, white, CMYK and one other "spot" colour, which may also be used for an additional white ink printhead.

In order to print the required layers in the required sequence, for example B, S, W(s), C, M, Y, K for a "right-reading" design typically for a panel to be applied to the outside of a building or vehicle window or K, Y, M, C, W(s), S, B for a "reverse-reading" design, backed up by the base layers of the print pattern, the design to be seen typically through a transparent light permeable material applied to the inside of a window, special orders of printheads and/or different connections to ink reservoirs of different colour are required, together with special software.

Any UV inkjet printing machine with a white ink capability can be used to practise the invention, for example UV inkjet machines made by the companies Vutek, Durst, Mimaki and Zund.

UV curable inks are suited to "drop on demand" (DOD) Piezo individual nozzles, the drop on demand shared wall and the continuous inkjet multi-deflection system, although the first two are preferred options for the present invention. In both of these preferred systems a Piezo crystal deforms when an electrical pulse is applied either to a single wall of a nozzle or to a shared wall between adjacent nozzles, which expresses the ink in a jet onto the substrate. The type of inkjet printers used for most see-through graphics panels are so-called large format inkjet printers and the two currently most used types of printhead for so-called large format digital UV inkjet printers are manufactured by either Spectra or Xaar. The advantage of UV curable inks and the so-called flatbed printers with which they are normally associated, compared to the water-based and solvent-based inkjet systems disclosed in EP 0 904 206, are that the curing system of UV light can be located immediately adjacent to the printhead and successive layers can be sequentially cured by a combination of appropriate range of UV wave lengths and durations. Most UV curable inks are cured almost instantaneously by correct UV lamp discharge. With so-called cationic inks, the UV curing process is triggered by UV light and the process continues until complete curing has occurred. UV curing inks therefore overcome the causes of lack of opacity between other types of inkjet ink, for example interaction of colours caused by solvent transfer and transfer of other ink components and smudging around the edges of multiple layers. UV inks also significantly decrease the time taken and therefore the potential cost of production compared to multi-application of layers and separate curing of layers of other types of ink. For example, tests have shown that with otherwise comparable printers to the Mimaki UJF-605C digital UV inkjet printer referred to earlier, a solvent ink curing time of 20-30 minutes was found to be necessary between successive layers, to achieve similar performance in the finished panel. UV curable ink is of special benefit therefore for the production of multi-layer printed portions within vision control panels according to GB 2 165 292 or EP 0 880 439. Because UV curable ink layers can be applied and cured sequentially, significant improvement in registration can be achieved, as the substrate does not have to move between successive ink applications in Printing Sequences 1-6. Piezo impulse inkjet systems also offer an appropriate range of resolution, say from 200 to 600 DPI at a reasonably high speed compared to other inkjet systems, cost being particularly important in most applications of see-through graphics, vision control panels, which are typically used for advertisements, signs and decorative displays.

The Printing Sequences 1-3, then 5 and 6 and then 4 feature progressively reduced movements of the printheads to build up the required layers, resulting in corresponding reductions in the elapsed time of printing a vision control panel with a consequent reduction in cost.

The software used in the present method typically includes the manipulation of a design by a computer to create the transparent areas or "T" layer according to EP 0 904 206. Base layers can be similarly produced by the application of a software mask or "T" layer or by positive computer artwork generation of the print pattern elements, whether these be discrete or interconnected.

The potential advantages of the present invention are all enabled by the adoption of a UV curable ink system, enabling localised and complete curing adjacent to the printheads, faster curing and therefore the faster build-up of any given number of superimposed ink layers, improved registration of the edges of a print pattern and reduced cost, compared to prior art methods of making such panels involving any digital printing and, compared to prior art non-digital printing methods, it offers more flexibility, speed of production and lower cost for low and medium production runs, the economic number of digital prints in a particular run being continually increased with the development of these digital printing machines.

UV curable inks have particular benefits for non-porous substrates, such as those typically used for see-through graphics, including plastic films or self-adhesive plastic film facestocks, for example print-treated polyester, PVC, acrylic and polycarbonate (PET) film or sheet plastic materials or glass. The drying demand for water-based and solvent-based inkjet ink is exacerbated with such non-porous substrates as little or no ink is absorbed by the substrate, whereas UV curable ink is internally curing and does not need to be absorbed or exposed to air and/or heat.

The method of the invention overcomes the prior art inkjet problems of:

(i) lack of opacity of the base layers, (ii) ink layer interaction, (iii) lack of registration of layers which must be printed separately with intermediate heat and air curing regimes which cause substrate movement between successive impressions, and (iv) the time taken to print multi-layer vision control panels because of the time required to cure successive layers of water-based or solvent ink.

Separately or in any combination, the first three problems typically result in the design of a one-way vision panel being visible from the other side, which is an undesirable feature detracting from the quality of through-vision, as well as appearing unsightly. GB 2 165 292 discloses an opaque silhouette pattern onto which a design is superimposed, all the layers being printed onto a transparent material. The silhouette pattern must be opaque for the design not to be visible from the other side of the transparent panel. EP 0 904 206 ('206) discloses a method of seeking to make panels according to EP 0 170 472 (the European family member patent of GB 2 165 292), including inkjet printing, and accepts that it may be impossible to achieve an opaque silhouette pattern with the prior art digital methods and that the design in this case will be visible from the other side of the panel. The '206 patent discloses the scientific means of quantifying this failure to achieve full opacity of the silhouette pattern, including the measurement of "Transmission Optical Density" (TOD) of the "light-restricting layer", another acknowledgement of the difficulty of achieving an opaque silhouette pattern by inkjet printing. The '206 patent also discloses a method intended to overcome this lack of opacity, by making panels with a digital printhead assembly incorporating both a thermal transfer head and thermal transfer ribbons to print the silhouette pattern (or base layers according to the present invention) and CMYK inkjet printheads to print the design. Thermal transfer technology typically deposits relatively thick layers of pigmented resin which can achieve substantial opacity. However, registering two different imaging techniques is potentially very difficult. As well as the complexity of a dual system, it incurs increased capital cost and increased cost of consumables, thermal transfer ribbons being relatively expensive compared to inkjet ink.

The present invention overcomes the problem of lack of opacity identified in the '206 patent by a purely inkjet technology, using UV curable inks, a much better solution as there is no question of incompatibility of marking materials between successive layers and no difficulty with registration of the separate layers within the print pattern.

The undesirable visibility of the design from the other side of the panel can also be caused by the interaction of layers printed by prior art methods using water-based or solvent-based digital inkjet inks. It has also been found that multiple layers of liquid toners applied in sequence on a drum of an electrophotographic digital printing machine, such as the HP Indigo (a trade mark of Hewlett Packard) also are subject to interaction and smudging of the edges of the print pattern. In contrast, superimposed UV inkjet layers cure independently in each self-contained layer and therefore also solve this problem.

The '206 patent also reviews the problem of registration of successive layers of ink deposits but only addresses the conventional "local registration index" (LRI) between the CMYK design colours, not the greater problem of registering all the layers, especially between base layers and design layers not printed in the same "pass" of a printhead assembly. This lack of registration is exacerbated if different printing systems are used, for example thermal transfer and inkjet. A method proposed in the '206 patent to seek to overcome the registration problem of an inkjet design printed over a light-restricting base layer is the use of a modified printer with tape registration marks, a laser or other light source and a light sensor, in order to instruct the firing of the inkjet nozzles only over the required area or areas of the silhouette pattern. U.S. Pat. No. 6,552,820 overcomes this problem by means of a light sensor which "trips" an inkjet printer to deposit design layer inks only when positioned over an opaque portion of a pre-printed silhouette pattern.

EP 0 934 169 and WO 04/0045937 provide a different solution to these problems of opacity and registration by automatically registering digital printing methods of printing a design, including inkjet printing, to an opaque silhouette pattern that has been pre-printed, typically mass produced by another technology, for example by screen printing, by "differential receptivity" or "differential adhesion". The inkjet ink only forms a durable image on the print pattern and can be relatively easily removed from the transparent areas of the panel.

Another cause of seeing the design or a "ghost" image of the design from the other side than intended, is because of reflection off transparent surfaces in front of the design. For example, if a one-way vision panel comprising a transparent self-adhesive film is applied to the inside of a double-glazed window, there are five surfaces off which the design will be reflected. It is preferable for this reason to have a one-way vision panel applied to the outside of a window. However, one-way vision panels printed by prior art water-based inkjet methods would typically need to be applied to the inside of a window or be overlaminated with a clear solar UV protective film, to provide weather protection to the ink.

The method of the present invention totally overcomes these problems of the prior art, as previously outlined, and therefore represents a very significant improvement over the prior art.

The invention claimed is:

[1. A method of making a panel comprising an imperforate sheet of colored or colorless light permeable material partially printed with a print pattern comprising a plurality of ink layers, said ink layers comprising a base layer, said ink layers comprising a design layer, said design layer comprising a design color layer, said print pattern comprising a plurality of connected and/or unconnected print pattern elements, said print pattern subdividing the panel into a plurality of areas of said print pattern and/or a plurality of unprinted areas of said light permeable material, and wherein the percentage of unprinted light permeable material is at least 5% and the light transmissivity of the panel is at least 10%, wherein a cross-section can be taken through said panel comprising two outer edges of said sheet of light permeable material and alternate printed portions and unprinted portions and a plurality of said printed portions comprising a part of said base layer and a plurality of said plurality of said printed portions comprising a part of said design layer, characterized in that all of said plurality of ink layers comprise UV cured ink comprising an agglomeration of overlapping and/or contiguous and/or spaced individual deposits of UV cured ink, said method comprising:

(i)providing a substantially imperforate sheet of colored or colorless light permeable material, and (ii) printing both said base layer and said design layer by a digital inkjet printer, wherein all said plurality of ink layers comprise UV cured ink printed by said digital inkjet printer, and wherein all said plurality of ink layers are applied within said printed portions and are not applied within said unprinted portions, wherein said printing is undertaken in a printing sequence, and wherein at one point in time during said printing sequence there are at least two more of said plurality of ink layers printed within one of said printed portions than the number of said plurality of ink layers printed within another of said printed portions.]

2. A method [as claimed in claim 1] *of making a panel comprising an imperforate sheet of colored or colorless light permeable material partially printed with a print pattern comprising a plurality of ink layers, said ink layers comprising a base layer, said ink layers comprising a design layer, said design layer comprising a design color layer, said print pattern comprising a plurality of connected and/or unconnected print pattern elements, said print pattern subdividing the panel into a plurality of areas of said print pattern and/or a plurality of unprinted areas of said light permeable material, and wherein the percentage of unprinted light permeable material is at least 5% and the light transmissivity of the panel is at least 10%, wherein a cross-section can be taken through said panel comprising two outer edges of said sheet of light permeable material and alternate printed portions and unprinted portions and a plurality of said printed portions comprising a part of said base layer and a plurality of said plurality of said printed portions comprising a part of said design layer, said method comprising:*

(*i*) *providing a substantially imperforate sheet of colored or colorless light permeable material, and*

(*ii*) *printing both said base layer and said design layer by a digital inkjet printer, wherein all said plurality of ink layers are applied within said printed portions and are not applied within said unprinted portions, wherein said printing is undertaken in a printing sequence, and wherein at one point in time during said printing sequence there are at least two more of said plurality of ink layers printed within one of said printed portions than the number of said plurality of ink layers printed within another of said printed portions*, wherein said printing comprises printing all of said plurality of ink layers over a first part of the overall area of said print pattern before any of said plurality of ink layers are printed over a second part of the overall area of said print pattern.

3. A method as claimed in claim 2, wherein:

said digital inkjet printer comprises a plurality of printheads in a printhead assembly on a printhead beam, wherein each of said printheads comprises a line of inkjet nozzles, said printhead assembly can be moved relative to said light permeable material in orthogonal X-Y directions, and said printing comprises printing said plurality of ink layers in one pass of said printhead beam relative to said light permeable material.

4. A method as claimed in claim 3, wherein said X direction is parallel to the width of said sheet and said Y direction is parallel to the length of said sheet.

5. A method as claimed in claim 3, further comprising unrolling said sheet from a roll of transparent film material, wherein said sheet has said X and Y directions, said Y direction being a direction from which the sheet is unrolled from the roll, and wherein said print pattern comprises a pattern of lines in the X direction across the width of said sheet.

6. A method as claimed in claim 3, wherein said printing comprises printing said plurality of ink layers in one pass of said printhead assembly relative to said light permeable material.

7. A method as claimed in claim 3, wherein said plurality of printheads in said printhead assembly are in line.

8. A method as claimed in claim 3, wherein each said line of inkjet nozzles is supplied with a single color of [UV curable] ink, and the printhead assembly can be moved relative to said light permeable material such that the lines of nozzles are presented to said light permeable material and can print in the sequential order of said base layer, followed by said design layer.

9. A method as claimed in claim 3, wherein each said line of inkjet nozzles is supplied with a single color of [UV curable] ink, and the printhead assembly can be moved relative to said light permeable material such that the lines of nozzles are presented to said light permeable material and can print in the sequential order of said design layer, followed by said base layer.

10. A method as claimed in claim 3, wherein each said line of inkjet nozzles is supplied by a single color of [UV curable] ink.

11. A method as claimed in claim 3, wherein the printhead assembly can be moved relative to said light permeable material such that the lines of nozzles are presented and can print in one pass of the substrate in the sequential order of a black ink base layer, then a white ink base layer, followed by ink for said design color layer.

12. A method as claimed in claim 3, wherein said base layer and said design layer are printed in one direction of movement of said sheet relative to said printhead beam in one of said orthogonal X-Y directions.

13. A method as claimed in claim 3, wherein said base layer and said design layer are printed in one pass of the printhead assembly in one of said orthogonal X-Y directions.

14. A method as claimed in claim 13, wherein base layer colors of black and white and design layer colors of cyan, magenta, yellow and black are printed simultaneously in said one pass of the printhead assembly.

15. A method as claimed in claim [3] *10*, wherein said single color is one of white, cyan, magenta, yellow and black, wherein a leading channel of one line of nozzles *is* dedicated to printing said base layer, and wherein a trailing channel of another line of nozzles is dedicated to printing said design color layer.

16. A method as claimed in claim 3, wherein the configuration of said printheads is amended from one configuration of said printheads to another configuration of said printheads.

17. A method as claimed in claim 3, wherein said lines of inkjet nozzles are divided into a plurality of channels.

18. A method as claimed in claim 17, wherein firmware in said inkjet printer manages said plurality of channels to print a part of said base layer and a part of said design layer in the same pass of said printhead assembly relative to said light permeable material.

19. A method as claimed in claim 18, wherein said plurality of channels enable the printing of a plurality of base layers.

20. A method as claimed in claim 19, wherein said plurality of base layers comprises 2, 3 or 4 base layers.

21. A method as claimed in claim 20, wherein said plurality of base layers comprises black and white layers.

22. A method as claimed in claim 18, wherein said base layer is printed before said design layer.

23. A method as claimed in claim 18, wherein said design layer is printed before said base layer.

24. A method as claimed in claim 18, wherein a reverse-reading design layer is printed before said base layer, said base layer followed by a right-reading design layer.

25. A method as claimed in claim 17, wherein said plurality of channels comprises four channels.

26. A method as claimed in claim 2, wherein said printing further comprises printing said plurality of ink layers over the second part of the overall area of said print pattern.

[27. A method as claimed in claim 1, wherein at a second point in time during said printing sequence after said one point in time, at least one of said plurality of ink layers are printed within the another of said printed portions.]

[28. A method as claimed in claim 1, wherein said sheet is a transparent material comprising two substantially parallel and plane surfaces.]

[29. A method as claimed in claim 1, wherein said base layer is white.]

[30. A method as claimed in claim 29, wherein said print pattern comprises another base layer, and wherein the color of said another base layer is one of black and white.]

[31. A method as claimed claim 29, wherein said another base layer is a composite black layer comprising cyan, magenta and yellow inks.]

[32. A method as claimed in claim 1, wherein said design layer comprises the colors of cyan, magenta, yellow and black in a four or six color process.]

[33. A method as claimed in claim 1, wherein said plurality of said plurality of printed portions comprise said design color layer.]

[34. A method as claimed in claim 1, wherein clear ink is printed within the print pattern.]

[35. A method as claimed in claim 1, wherein each of said plurality of printed portions is of width less than 10 mm.]

[36. A method as claimed in claim 1, wherein said printing of both said base layer and said design color layer is undertaken in one printing operation without removal of said light permeable material from said inkjet printer.]

[37. A method as claimed in claim 1, wherein said UV curable ink is applied unidirectionally.]

[38. A method as claimed in claim 1, wherein said UV curable ink is applied bidirectionally.]

[39. A method as claimed in claim 1, wherein said design layer is printed by means of computer software manipulation to create said design layer within said print pattern elements.]

[40. A method as claimed in claim 1, wherein computer software determines the positions of the printed portions and unprinted portions and causes the digital inkjet printer to eject ink from the digital inkjet printer solely within said printed portions during the printing of both said base layer and said design color layer.]

[41. A method as claimed in claim 1, wherein said printing of printed portions and the non-printing of said unprinted portions is determined by computer firmware in said inkjet printer.]

[42. A method as claimed in claim 1, wherein computer firmware in said inkjet printer determines the positions of the printed portions and unprinted portions and causes the digital inkjet printer to eject ink from the digital inkjet printer solely within said printed portions during the printing of both said base layer and said design color layer.]

[43. A method as claimed in claim 1, wherein said printing both said base layer and said design color layer by a digital inkjet printer comprises ejecting ink from said digital inkjet printer only within said printed portions.]

[44. A method as claimed in claim 1, wherein said digital inkjet printer is a flatbed printer.]

[45. A method as claimed in claim 1, wherein said design layer is visible from one side of the panel and is not visible from the other side of the panel.]

[46. A method as claimed in claim 1, wherein said print pattern comprises a white translucent base layer and a translucent design layer.]

[47. A method as claimed in claim 1, wherein there are at least one of three, four or five more of said plurality of ink layers printed within one of said printed portions than the number of said plurality of ink layers printed within another of said printed portions.]

*48. The method of claim 2, wherein a perceived design formed by the design layer is visually independent of a shape of said base layer.*

*49. A method as claimed in claim 2, wherein said base layer is white.*

*50. A method of making a panel comprising an imperforate sheet of colored or colorless light permeable material partially printed with a print pattern comprising a plurality of ink layers, said ink layers comprising a base layer, said ink layers comprising a design layer, said design layer comprising a design color layer, said print pattern comprising a plurality of connected and/or unconnected print pattern elements, said print pattern subdividing the panel into a plurality of areas of said print pattern and/or a plurality of unprinted areas of said light permeable material, and wherein the percentage of unprinted light permeable material is at least 5% and the light transmissivity of the panel is at least 10%, wherein a cross-section can be taken through said panel comprising two outer edges of said sheet of light permeable material and alternate printed portions and unprinted portions and a plurality of said printed portions comprising a part of said base layer and a plurality of said plurality of said printed portions comprising a part of said design layer, said method comprising:*

*(i) providing a substantially imperforate sheet of colored or colorless light permeable material, and*

*(ii) printing both said base layer and said design layer by a digital inkjet printer, wherein all said plurality of ink layers are applied within said printed portions and are not applied within said unprinted portions, wherein said printing is undertaken in a printing sequence, and wherein at one point in time during said printing sequence there are at least two more of said plurality of ink layers printed within one of said printed portions than the number of said plurality of ink layers printed within another of said printed portions, wherein said printing comprises simultaneously printing a portion of said base layer and a portion of said design layer.*

* * * * *